(12) United States Patent
Li et al.

(10) Patent No.: US 9,218,035 B2
(45) Date of Patent: Dec. 22, 2015

(54) RENEWABLE ENERGY CONTROL SYSTEMS AND METHODS

(71) Applicants: Tao Li, Gainesville, FL (US); Chao Li, Gainesville, FL (US)

(72) Inventors: Tao Li, Gainesville, FL (US); Chao Li, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 244 days.

(21) Appl. No.: 13/763,643

(22) Filed: Feb. 9, 2013

(65) Prior Publication Data

US 2013/0212410 A1 Aug. 15, 2013

Related U.S. Application Data

(60) Provisional application No. 61/597,545, filed on Feb. 10, 2012.

(51) Int. Cl.
   *G06F 1/26* (2006.01)
(52) U.S. Cl.
   CPC ..................... *G06F 1/263* (2013.01)
(58) Field of Classification Search
   CPC ........... G06F 1/189; G06F 1/26; Y02E 10/40; Y02E 10/50
   USPC .......................................................... 713/300
   See application file for complete search history.

(56) References Cited

U.S. PATENT DOCUMENTS

| 7,962,769 | B1 * | 6/2011 | Patel et al. ..................... 713/300 |
| 8,108,081 | B2 * | 1/2012 | Lenox ........................... 700/295 |
| 2011/0121648 | A1 * | 5/2011 | Pan ................................ 307/26 |
| 2011/0278928 | A1 * | 11/2011 | Burger et al. .................... 307/39 |
| 2011/0307113 | A1 * | 12/2011 | Kumar et al. ................. 700/291 |
| 2012/0303174 | A1 * | 11/2012 | Szu et al. ....................... 700/297 |
| 2013/0043724 | A1 * | 2/2013 | Daniels et al. ................... 307/23 |
| 2013/0249298 | A1 * | 9/2013 | Dong et al. ..................... 307/80 |
| 2013/0266300 | A1 * | 10/2013 | Kreutzman .................... 392/501 |

* cited by examiner

*Primary Examiner* — Vincent Tran
(74) *Attorney, Agent, or Firm* — Thomas|Horstemeyer, LLP.

(57) ABSTRACT

Various examples are provided for renewable energy control. In one example, among others, a system includes a PV source, a multi-core processor load, and a solar power manager configured to adjust an operating point of the PV source about a maximum power point by dynamically adjusting a transfer ratio and a load level. In another example, a method includes sensing an output current supplied to a multi-core processor load by a power converter at a first transfer ratio, sensing another output current supplied at a second transfer ratio, and determining an operating point of the PV source with respect to a maximum power point based upon the output currents. In another example, a system includes a power manager configured to switch servers between a renewable energy supply and a utility energy supply based at least in part upon a budget level and the load power consumption.

22 Claims, 23 Drawing Sheets

Three typical PV systems: (A) grid-connected, (B) direct-coupled, and (C) battery-equipped

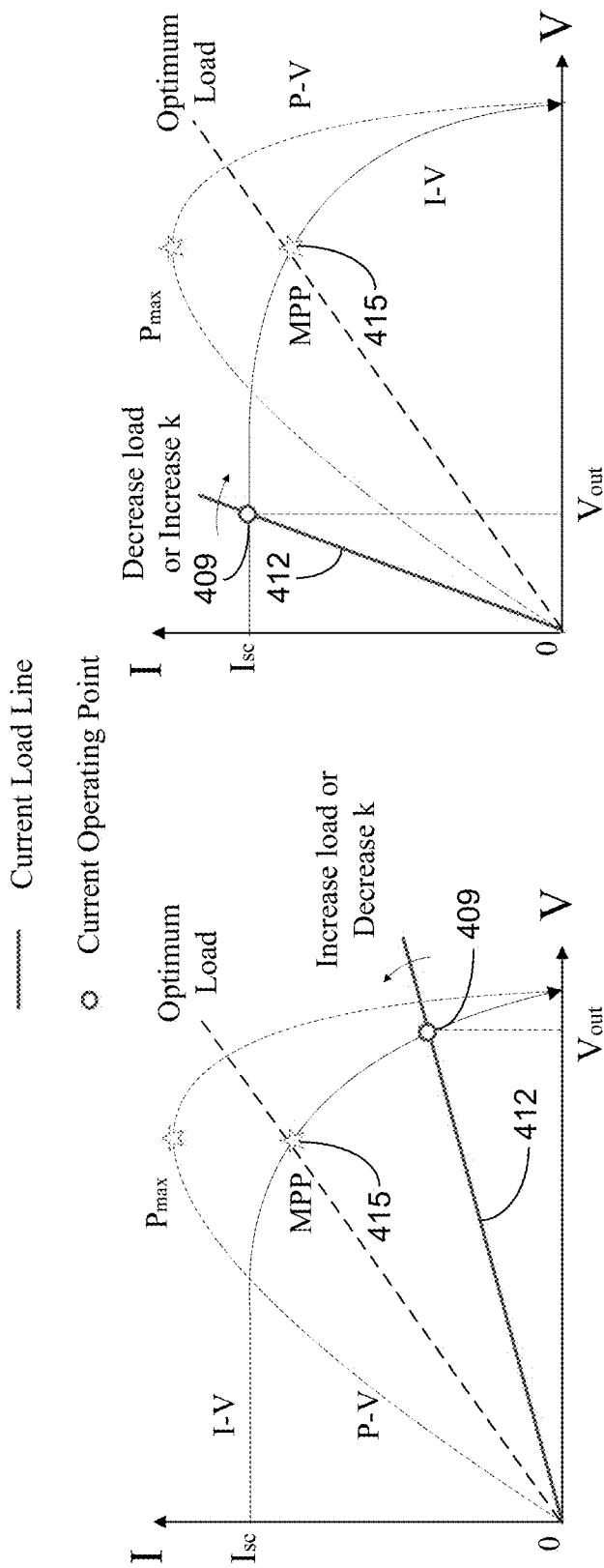

```
// Eight cores are indexed in Core_ID[]
1.   Update ai, bi for each core;
2.   Quick-Sort Core_ID[] based on the throughput-power ratio of each core;
3.   Restore front pointer to Core_ID[0]; restore rear pointer to Core_ID[7];
4.   if (additional power available == TRUE) {   // We have additional power-headroom
5.       if ( previous operation is to decrease the workload )
6.           break;                // An optimum operating point is obtained
7.       else {                    // We still have to increase load successively
8.           while (Core_ID[front] operates in its highest voltage level )
9.               front++;
10.          Increases the voltage level of Core_ID[front];
11.      }
12.  }
13.  if ( power budget decrease == TRUE ) {   // We have to decrease the workload
14.      if ( previous operation is to increase the workload ) {
                                   // We are now above the power budget
                                   decrease the voltage level of Core_ID[rear];
15.          break;
16.      }
17.      else {
18.          while( Core_ID[rear] operates in its lowest voltage level  )
19.              rear--;
20.          Decrease the voltage level of Core_ID[rear];
21.      }
22.  }
```

FIG. 12

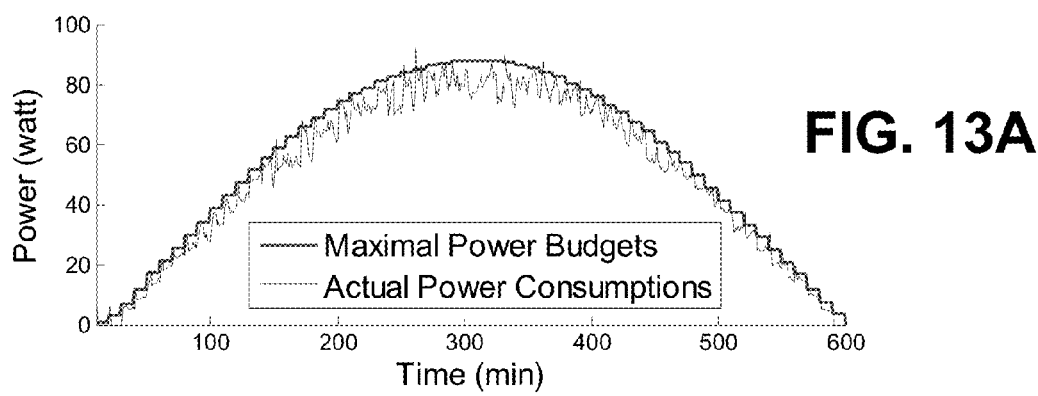
H1 (high EPI, homogeneous)
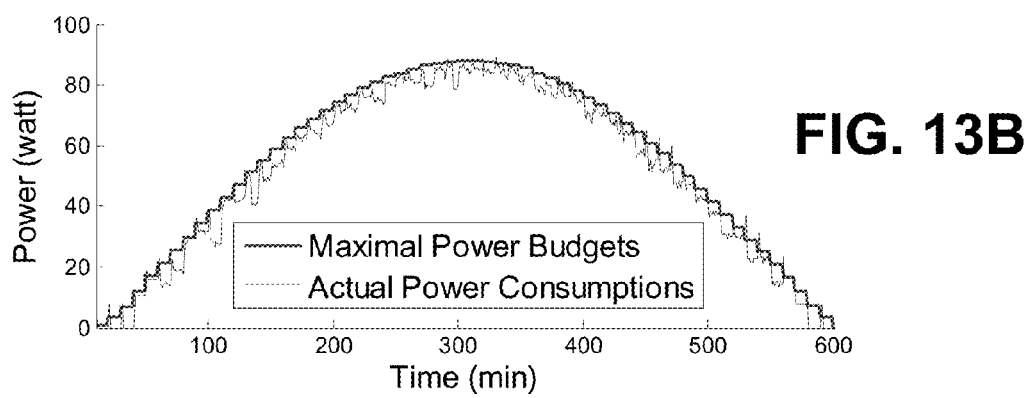
HM2 (high EPI, heterogeneous)
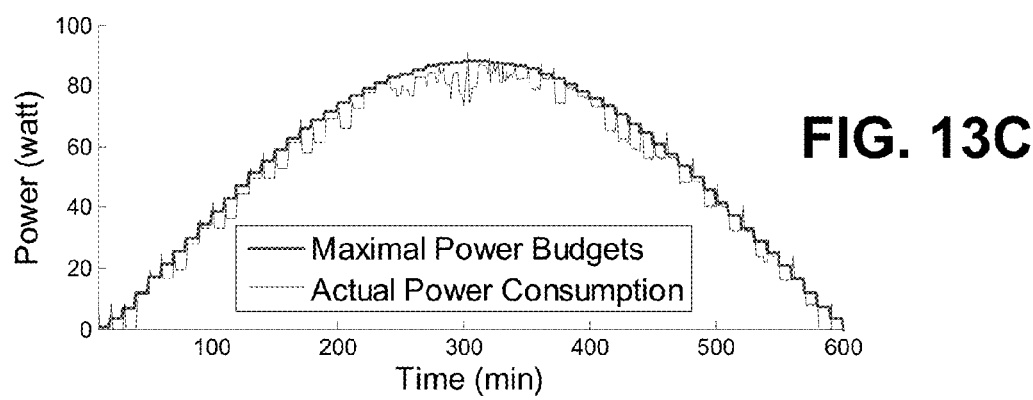
L1 (low EPI, homogeneous)

H1 (high EPI, homogeneous)

HM2 (high EPI, heterogeneous)

L1 (low EPI, homogeneous)

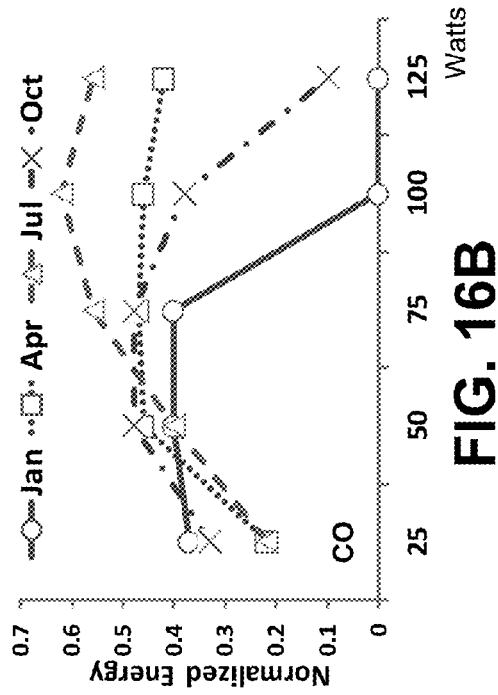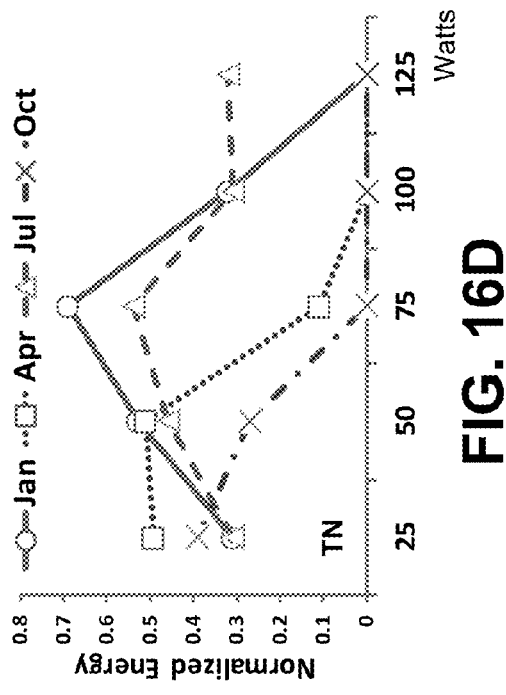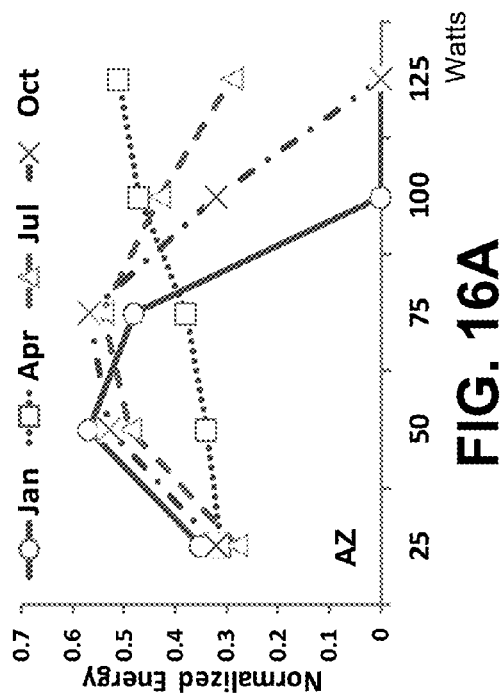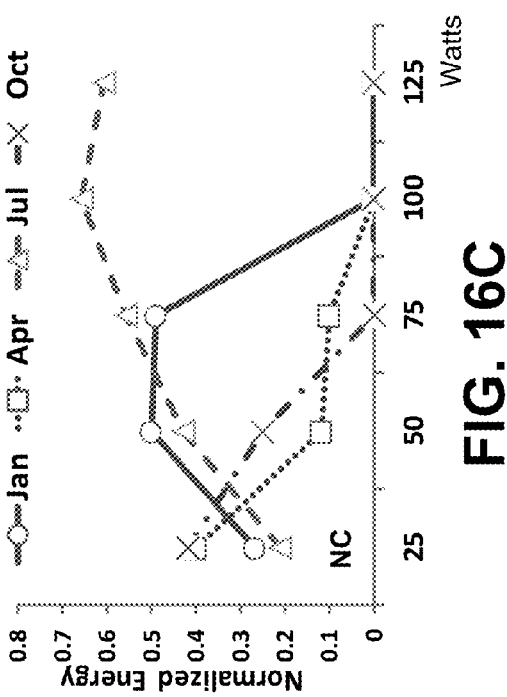
FIG. 16A
FIG. 16B
FIG. 16C
FIG. 16D

Normalized control overhead

Average energy utilization

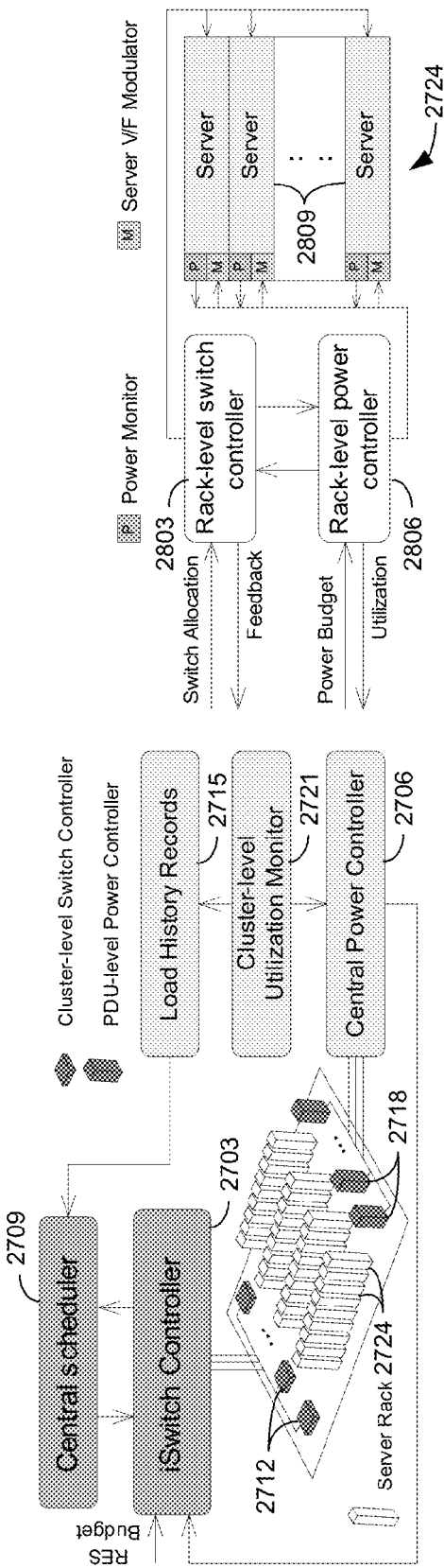
FIG. 27
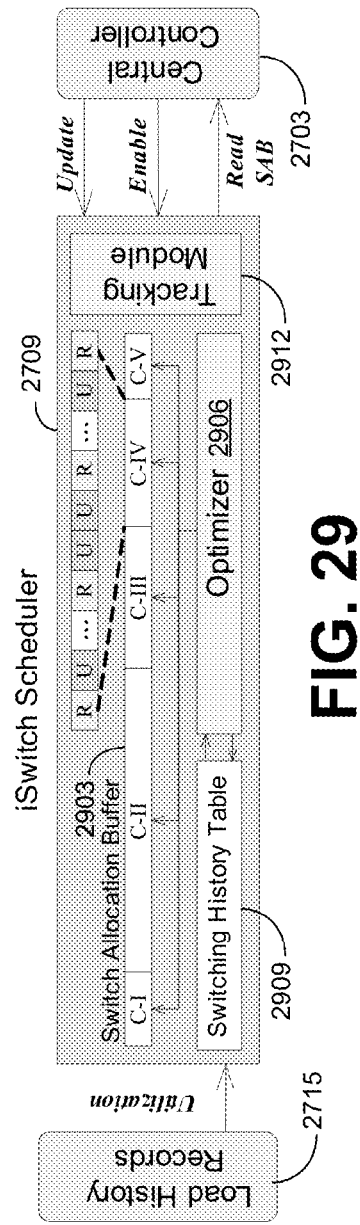
FIG. 28
FIG. 29

RENEWABLE ENERGY CONTROL SYSTEMS AND METHODS

CROSS REFERENCE TO RELATED APPLICATIONS

This application claims priority to U.S. provisional application entitled "RENEWABLE ENERGY CONTROL SYSTEMS AND METHODS" having Ser. No. 61/597,545, filed Feb. 10, 2012, the entirety of which is hereby incorporated by reference.

STATEMENT REGARDING FEDERALLY SPONSORED RESEARCH OR DEVELOPMENT

This invention was made with government support under CAREER grant CCF-0845721 awarded by the National Science Foundation. The Government has certain rights in the invention.

TECHNICAL FIELD

The present disclosure generally relates to renewable energy, and in particular, to systems and methods that integrate renewable energy sources.

BACKGROUND

The global energy crisis and environmental concerns (e.g., global warming) have driven the information technology (IT) community into the green computing era. Clean renewable energy sources include solar power and wind power. However, the lack of a performance guarantee when renewable generation is low and/or fluctuating can make such green power unsuitable for IT applications such as, e.g., data centers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5A and 5B are schematic diagrams that illustrate examples of characteristics of load matching.

FIG. 12 is a schematic diagram that illustrates an example of pseudo code for per core load tuning.

FIGS. 13A-13C are schematic diagrams that illustrate examples of MPP tracking accuracy for different workloads with high solar power generation.

FIGS. 16A-16D are schematic diagrams that illustrate examples of normalized solar energy usage under different fixed power budgets.

FIG. 27 is a schematic diagram that illustrates an example of facility level controls for a renewable energy control system.

FIG. 28 is a schematic diagram that illustrates an example of rack level controls for a renewable energy control system.

FIG. 29 is a schematic diagram that illustrates an example of a scheduler for a renewable energy control system.

DETAILED DESCRIPTION

Figure 1:
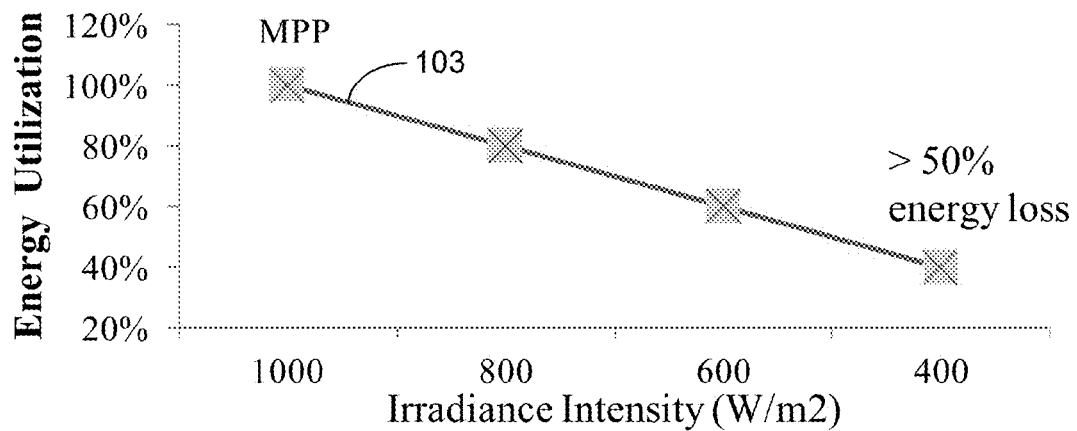
FIG. 1 is a schematic diagram that illustrates how solar energy utilization efficiency varies for fixed loads under different solar irradiance intensity.

Of the clean renewable energy sources that may be used for green computing, solar and wind power are the most promising. For instance, on a per device level such as a processor (e.g., microprocessors), efforts have been made to improve the performance-per-watt. However, conventional processor architecture power management schemes incur significant solar energy loss since they are largely workload-driven and unaware of the supply-side attributes. Solar power harvesting techniques may improve the energy utilization but increase the environmental burden and capital investment due to the inclusion of large-scale batteries. Moreover, solar power harvesting itself cannot guarantee high performance without appropriate load adaptation.

On a network level, large-scale computing systems such as data centers are facing increasing pressure to cap their carbon footprint. The integration of clean energy solutions into computer system design can provide significant gains in the green computing era. However, the lack of performance guarantee when renewable generation is low and/or fluctuating may inhibit the use of such green energy sources. For example, data centers designed to track intermittent renewable power, such as that harvested from wind, can incur up to a 4× performance loss due to inefficient and redundant load matching activities. As a result, mitigating operational overhead while still maintaining desired energy utilization becomes a significant challenge in managing server clusters on intermittent renewable energy generation.

Certain embodiments of renewable energy control systems and methods are disclosed herein in the context of device and system level integration. Examples of device embodiments (which may include one or more sub-systems) are also referred to herein as SolarCore and examples of system embodiments (which may be embodied in one or more devices) are also referred to herein as iSwitch. With respect to SolarCore, certain embodiments are disclosed that include a solar energy driven, multi-core architecture power management scheme that combines maximal power provisioning control and workload run-time optimization. Using real-world meteorological data across different geographic sites and seasons, it can be shown that SolarCore is capable of achieving an optimal operation condition (e.g., maximal power point) of solar panels while operating autonomously under various environmental conditions with a high green energy utilization (e.g., of 82% on average, though not limited to 82%). In some embodiments, efficient heuristics (e.g., algorithm, method, etc.) for allocating the time varying solar power across multiple cores are disclosed, wherein the implementation may further improve the workload performance (e.g., by 10.8%, though not limited to this performance measure) compared with that of round-robin adaptation, and even significantly more (e.g., at least 43%) compared with that of conventional fixed-power budget control. Certain embodiments of SolarCore can maximally reduce the carbon footprint of computing systems through the usage of renewable energy sources using joint optimization techniques, providing a truly sustainable high-performance computing environment.

Also disclosed are certain system level embodiments of renewable energy control systems (also referred to herein also as iSwitch) that address the operational overhead of a renewable energy powered data center. In some embodiments of iSwitch, a lightweight server power management that follows renewable power variation characteristics is disclosed, which leverages existing system infrastructures, and applies a supply/load cooperative scheme to mitigate the performance overhead. For instance, compared to state-of-the-art renewable energy driven system designs, iSwitch may mitigate average network traffic (e.g., by 75%, though not limited to this performance), peak network traffic (e.g., by 95%, though not limited to this performance), and reduce job waiting time (e.g., by 80% though not limited to this performance) while still maintaining renewable energy utilization (e.g., 96% though not limited to this performance). Certain embodiments of iSwitch may help computer architects make informed decisions on sustainable and high-performance system design.

Having summarized certain features of renewable energy control systems of the present disclosure, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

The continuing decline of conventional fossil fuel has resulted in increasing energy costs all around the world. Meanwhile, fossil fuel and its induced greenhouse gas emissions have had profound impact on the environment and the climate of our planet. These trends have led the IT community into the renewable energy driven, green computing era. Among various renewable energy options, photovoltaic (PV) generation is gaining increased importance due to advantages such as absence of fuel cost, low maintenance, and no noise and wear due to the absence of moving parts. It is expected that PV system installations will provide 15%-20% of the global electricity in 2040. Today, solar energy is not only being used for powering various low-power electronic devices and household appliances, but it is also drawing increased attentions in performance-focused computing environments such as data centers. Internet giants, such as Google, Microsoft and Yahoo all power part of their data centers using renewable resources such as solar farms. As will be described below, certain embodiments of renewable energy control systems, or rather, SolarCore, extend the benefits of solar energy to the high performance computer architecture design area. Specifically, certain embodiments of SolarCore provide a joint optimization of green energy utilization and workload performance for multi-core processors, which comprise the mainstream hardware design choice for today's IT industries and demand increasing amounts of power to unleash their full computation potential.

Although solar energy is an abundant energy source, its efficient utilization presents a new challenge. In PV systems, sunlight is converted into DC electricity using PV cells. Implemented as a p-n junction fabricated in a thin wafer, PV cells have a non-linear relationship between their output photocurrent and terminal voltage. Under uniform irradiance intensity (solar energy per unit area of the solar panel's surface) and temperature, photovoltaic arrays exhibit a current-voltage characteristic with a unique point, called the maximum power point (MPP), where the module produces maximum output power. Due to the high fabrication cost (e.g., for material, ingot, and wafering) and low conversion efficiency of present solar cells (typically about 13% to about 19%), it is important to operate the PV cell at the maximum power point in order to achieve the maximum efficiency. Nevertheless, the power generated by PV systems changes over time due to the unpredictable nature of weather pattern. FIG. 1 illustrates the variation in solar energy utilization efficiency 103 for fixed load under different solar irradiance intensity. The unstable working environment along with the existence of optimum operating points motivate the rethinking of conventional multi-core power management policy to achieve higher efficiency in utilizing solar energy. Moreover, the processor load can be regulated and tuned in such a way that the overall workload performance is also optimized during the successive MPP tracking.

Figure 2:
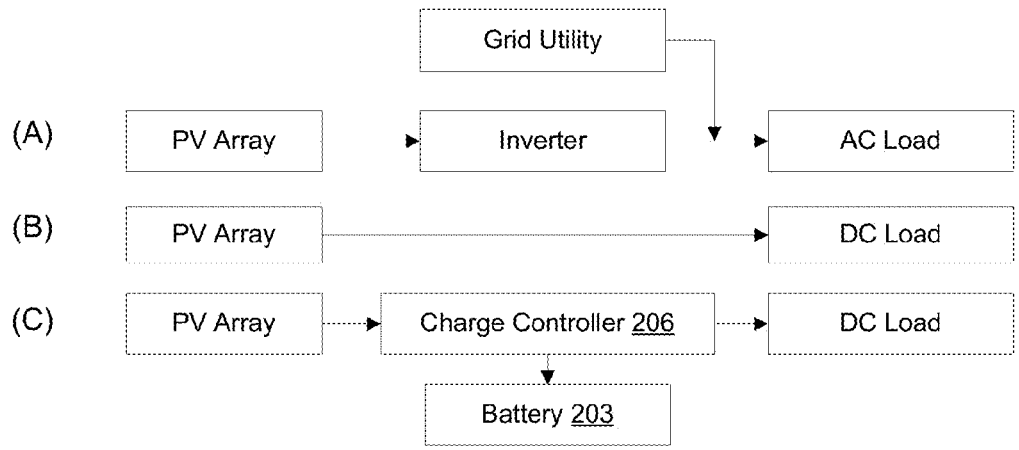
FIG. 2 is a block diagram that illustrates various examples of photovoltaic (PV) systems.

There are various ways to connect a PV array to the load. FIG. 2 shows three examples of PV systems: (A) grid-connected, (B) direct-coupled, and (C) battery-equipped. For instance, solar-powered systems of FIG. 2(C) can employ energy storage elements (e.g., batteries and/or super-capacitors) 203 and a charge controller 206 to backup energy which reduces voltage fluctuations and improves maximum power tracking. However, energy storage elements 203 introduce limitations in PV system utilization. For example, the energy that can be delivered may be limited by the battery capacity and this can adversely affect the performance of multi-core systems. For example, large current draws by multi-core chips may require a battery with large capacity, which is both bulky and expensive, to support the load demands. In addition, the turn-around efficiency of a battery is low due to, for instance, internal resistance and self-discharge. These de-rating factors may contribute to a significant loss in energy efficiency (e.g., up to 30% energy loss). Additionally, existing rechargeable batteries all have limited lifetime. Frequent charge/discharge cycling (e.g., in the case of using low-capacity batteries) and self-discharge further aggregate the aging effect. Without proper maintenance (which can require human intervention and cause loss of availability), the aging problem may directly lead to capacity reduction and output voltage change. As a result, over the lifetime of a solar-powered system, battery cost (e.g., initial and maintenance costs) can be the most expensive component of the renewable energy system.

The present disclosure considers the cost-effective, direct-coupled PV system design of FIG. 2(B), which can be used in applications such as heating and water pumping. For a direct-coupled PV system, the solar-panel load is a DC load and no power inverter is used. In an embodiment of SolarCore, when the solar power supply drops below a certain threshold, a secondary power supply (e.g., a grid utility) is switched in (via a power switch) and used as a power supply until sufficient solar power is available. Different from conventional direct-coupled PV systems, certain embodiments of SolarCore enable multi-core processors to autonomously maximize the harvest of the renewable energy supply. As a result, SolarCore may eliminate or significantly mitigate the limitations (e.g., low performance, short-lifetime and/or high-cost) due to inclusion of batteries, while delivering satisfactory green energy utilization and high workload performance. Note that in some embodiments, the existing power supply need not be completely replaced. One benefit of using SolarCore is that it reduces the power dependence on fossil-fuel-based power supplies while simultaneously optimizing the workload performance.

In the description below, disclosed is a characterization of PV cell/module under varying atmospheric conditions. Unlike conventional power sources, matching the power consumption level with the supply level may make a significant difference in solar energy utilization. In addition, certain embodiments of SolarCore include a multi-core architecture power management scheme that addresses a two-fold challenge, namely to maximize a multi-core processor's total solar energy utilization by performing load matching under variable PV power output and to intelligently allocate the dynamically varied power budget across multiple cores so that the maximum workload performance can be achieved.

Also disclosed herein are results of extensive simulations to evaluate the effectiveness of SolarCore. Characterizations of MPP tracking efficiency and workload behavior using real-world solar irradiance data across different geographic locations and seasons are also presented. In addition, disclosed are characterizations of the green energy utilization and multi-core performance of various solar energy based power management schemes. In some embodiments, SolarCore may extract 82% solar energy on average without relying on storage elements 203. Compared with the most efficient battery-based maximum power point tracker (MPPT) systems, SolarCore yields less than 1% performance degradation and can overcome major drawbacks such as, e.g., short life time, high capital cost and/or negative environment impact.

Figure 3:
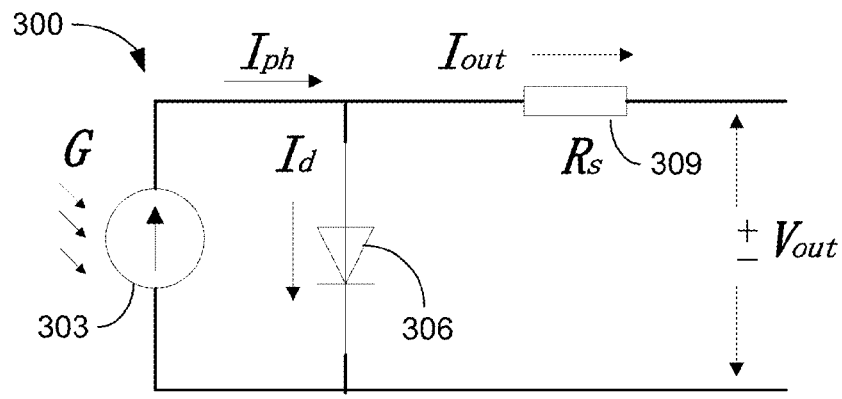
FIG. 3 is a schematic diagram that illustrates an example of an equivalent circuit of a solar cell.

Digressing briefly, a photovoltaic (PV) cell (or solar cell) is generally a p-n junction fabricated in a thin wafer or layer of semiconductor. The PV cell is the basic building block of PV systems, where the electromagnetic radiation of sun is directly converted to electricity through the photovoltaic effect. In this section, solar power characteristics and important factors in designing solar energy driven computing systems are disclosed. During darkness, the PV cell does nothing. In other words, the PV cell behaves like a diode, generating a current $I_d$ (also referred to as the dark current) under forward bias. When it is switched on by sufficient sunlight irradiance, the solar cell can generate a voltage. As shown in FIG. 3, a simple equivalent circuit 300 of an ideal solar cell may be modeled by a current source 303 in parallel with a diode 306. When switched on, the ideal cell produces a photocurrent ($I_{ph}$) proportional to the light intensity. To obtain a more accurate current-voltage (I-V) characteristic of a solar cell, the series resistance $R_s$ 309, representing the internal losses due to the current flow, and parallel resistance $R_p$ (not shown), representing the leakage current to the ground, may be added to the ideal model. In addition, a second non-ideal diode (not shown) may be added in parallel to the current source 303. For purposes of facilitating understanding, a model of moderate complexity is chosen, which captures the solar radiation and temperature impact on the photocurrent ($I_{ph}$) and saturation reverse current ($I_0$) of the diode. In addition, the selected model only considers the series resistance 309 since the impact of shunt resistance (parallel resistance) is negligible.

The electrical behavior of a solar cell is given by its I-V characteristic equation, which relates solar cell parameters and environment conditions to the output current ($I_{out}$) and voltage ($V_{out}$). In FIG. 3, the output current ($I_{out}$) is a complex function of the sun irradiance (G), the operating temperature (T), and the terminal voltage ($V_{out}$).

Figure 4A:
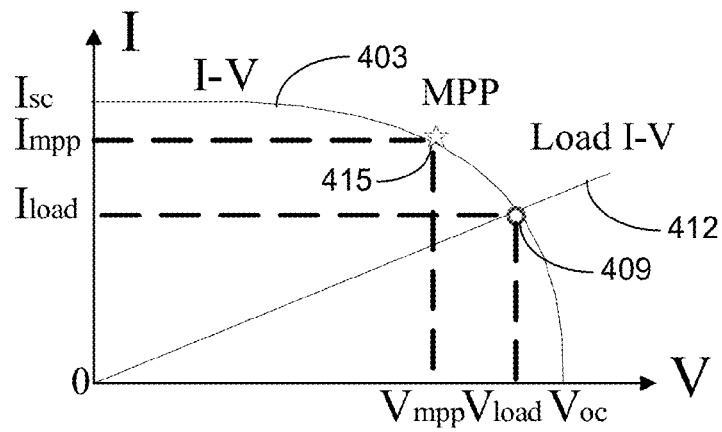
FIGS. 4A and 4B are schematic diagrams that illustrate examples of I-V and P-V characteristics of a PV cell operating at a specific resistive load and MPP.
Figure 4B:
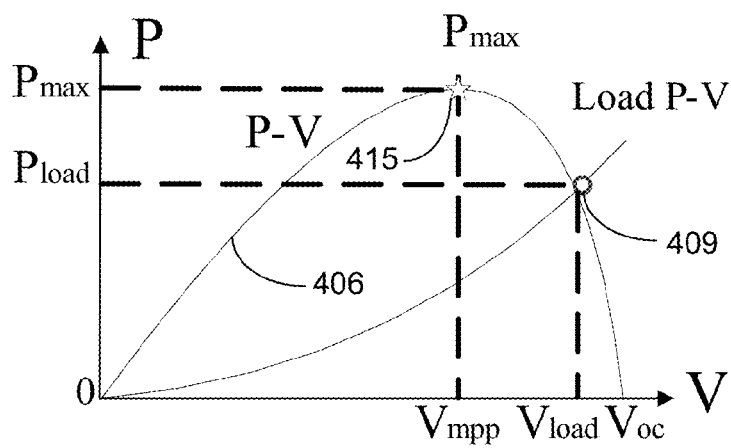

FIGS. 4A and 4B show examples of an I-V curve 403 and a P-V curve 406 of a solar (or PV) cell, assuming constant sun irradiance and temperature. When the cell is operated at open circuit, $I_{out}=0$, the voltage across the output terminals is defined as the open circuit voltage ($V_{oc}$). Similarly, when the solar cell is operated at short circuit, $V_{out}=0$, the current through the output terminals is defined as the short circuit current ($I_{sc}$). For a high-quality solar cell, $R_s$ and $I_0$ are low and $R_p$ is high, therefore $I_{sc} \approx I_{ph}$. For a given load $R_L$, the cell develops a terminal voltage between 0 and about $V_{oc}$. Assuming there is no energy loss between the PV output power and the load input power, the operating point 409 is the intersection between the I-V curve of the load 412 and the I-V curve of the PV cell 403.

For a given I-V curve under constant ambient irradiation and temperature, there is a single operating point (MPP) 415 where the values of the voltage ($V_{mpp}$) and current ($I_{mpp}$) of the cell result in the maximum power output ($P_{max}$), which is the optimal operation point for the efficient use of the solar energy. As shown in FIG. 4, a load connected PV cell may operate (as determined by the intersection of the I-V curve and the load line) far from its optimal condition (i.e., MPP 415 at $P_{max}$), resulting in inefficient solar power utilization. Moreover, since the MPP 415 varies with the solar irradiance and temperature, the optimal operating point of the photovoltaic cell changes dynamically.

When connected to electrical loads, solar panels generally employ power converters to achieve appropriate output voltage. Such power converters may be implemented by using controllable converters, such as a Pulse Width Modulation (PWM) based converter. Assuming $P_{in}=P_{out}$, the transformation may be described as $V_{out}=V_{in}/k$ and $I_{out}=k \cdot I_{in}$, where k is the transfer ratio that can be adjusted by changing the duty cycle of the PWM. The actual operating point 409 of the PV system occurs at the intersection of the electrical characteristics of the solar panel and the load. By load matching, a maximum power point tracker (MPPT) is able to extract the optimal power from the panel under varying atmospheric conditions. Such load matching may be achieved by either adjusting the DC-DC converter transfer ratio, k, or tuning a multi-core load, w (e.g., via dynamic voltage/frequency scaling (DVFS)). For a multi-core processor, its electrical characteristics are largely dependent on parameters such as clock frequency and supply voltage. For instance, as the clock frequency increases, the multi-core processor may exhibit lower impedance and draw more current and power.

FIGS. 5A and 5B illustrate how the operating point changes if the two system parameters are tuned, e.g., by adjusting the multi-core load w or transfer ratio k. The characteristics of load matching (P, V and I are all for DC/DC output values). The output voltage decreases when the load line 412 moves counterclockwise and increases when the load line moves clockwise. However, due to the existence of the MPP 415, the actual output power may either increase or decrease as the load line 412 moves, depending on whether the operating point 409 is approaching the MPP 415 or not. In FIG. 5A, increasing load or decreasing k will approach MPP. In FIG. 5B, decreasing load or increasing k will approach MPP. Note that simply increasing the multi-core processor utilization rate and voltage level does not automatically draw maximal power because the load adaptation scheme (i.e. increasing or decreasing the load) varies with different operating point positions, as shown in FIGS. 5A and 5B. On the other hand, tuning the transfer ratio alone cannot increase the multi-core performance either due to the lack of effective multi-core load adaptation. Moreover, without appropriate coordination between the power converter and load adaptation, the system may suffer from severe voltage fluctuations.

Solar cells are the basic building blocks of solar photovoltaic systems. When charged by the sun, each PV cell can generate a photo-voltage of about 0.5V to about 1V and tens of milliamps of short circuit current. PV modules consist of multiple interconnected PV cells which are arranged in a series-parallel structure to achieve desired power output. PV modules can be further combined to form a PV array. In the present disclosure, a BP3180N polycrystalline 180 W solar module is modeled for illustrative purposes.

Figure 6:
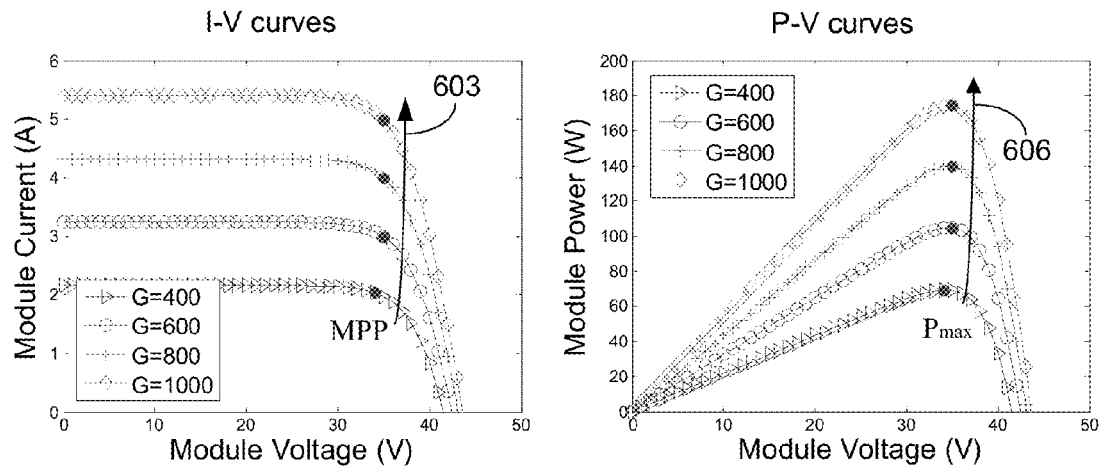
FIG. 6 includes schematic diagrams that illustrate examples of I-V and P-V curves for various irradiations.
Figure 7:
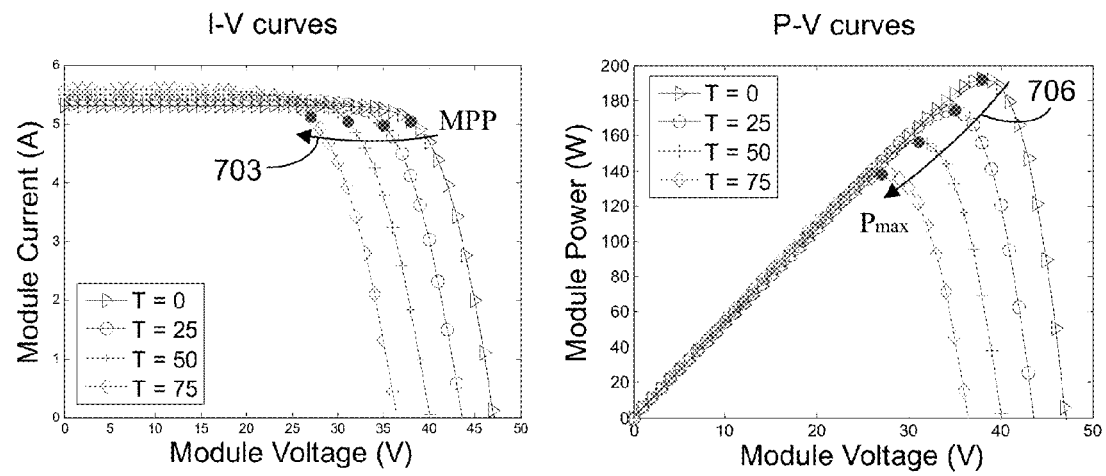
FIG. 7 includes schematic diagrams that illustrate examples of I-V and P-V curves for various temperatures.

The PV cell equivalent circuit model described above was simulated using SPICE, where both current versus voltage (I-V) and power versus voltage (P-V) characteristics of the subject solar panel at various insulation and temperature conditions were modeled. FIG. 6 illustrates I-V and P-V curves for various irradiations at a temperature of T=25° C. FIG. 6 illustrates I-V and P-V curves for various temperatures at an irradiation of G=1000 W/m². As shown in FIGS. 6 and 7, higher sun irradiance (G) generates more photocurrent and the MPP 415 consequently moves upward (arrow 603) and $P_{max}$ increases (arrow 606). When the environment temperature rises, the open circuit voltage is reduced and the short circuit current increases. Since the voltage decrease is faster than the current increase, MPP 415 shifts left (arrow 703) and the total power $P_{max}$ that a PV module can produce is reduced at a higher temperature (curve 706). As can be seen, unlike conventional energy sources, the solar power produced by the PV cell varies significantly under different atmospheric conditions. To harvest the maximum energy, it is important that the multi-core power management schemes are capable of identifying and tracking the MPP 415.

Figure 8:
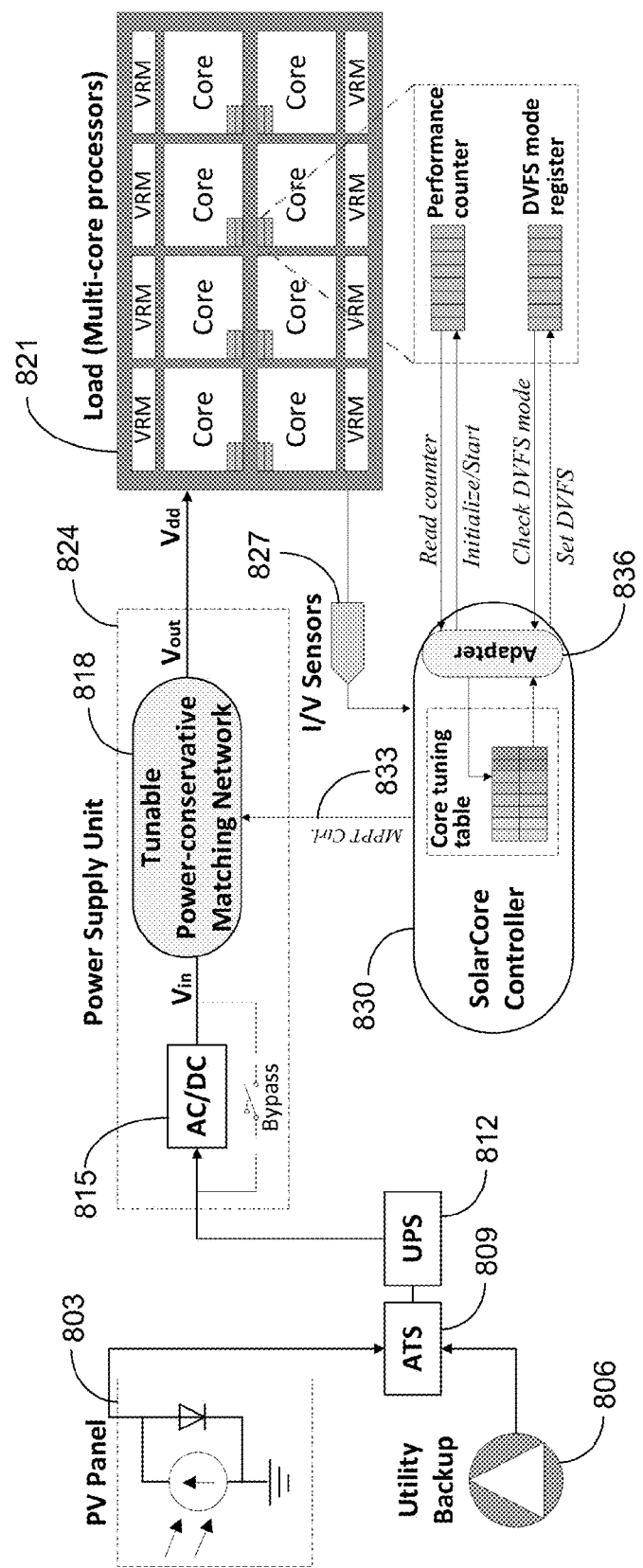
FIG. 8 is a block diagram that illustrates an example of a renewable energy control system.

Attention is directed to FIG. 8, which illustrates one embodiment of a SolarCore power management architecture, with the understanding that other architectures may be used in some embodiments. Certain embodiments of SolarCore provide solar energy driven multi-core architecture power management that can achieve the maximal solar energy utilization and the optimal workload performance simultaneously, reducing the dependence on the utility power of a high performance computing system. A lower dependence saves more on utility bills and produces a lower carbon footprint, which is more sustainable.

As shown in FIG. 8, the SolarCore system may be powered by solar energy from a PV panel 803 with a grid utility 806 as backup. An automatic transfer switch (ATS) 809 can be employed to seamlessly select between the primary (e.g., the solar panel 803) and backup power sources and an uninterruptable power supply (UPS) 812 ensures continuous power delivery to the load. An AC/DC converter 815 can be used if the ATS 809 switches to the utility backup 806. A tunable power-conservative matching network 818 (e.g., a DC/DC converter) is used to convert the PV output voltage to the level (e.g., 12V) that is compatible with a load 821 such as, e.g., existing multi-core processors and systems.

A power supply unit (PSU) 824 can include multiple output rails, which can be leveraged to power different system components with different power supplies (e.g., solar and/or utilities). In certain embodiments, the multi-core processors, which contribute to significant power dissipation in typical multi-core systems, are powered by the renewable energy source (e.g., PV panel 803) while the rest of the system is powered by energy from the utilities. The output power of the PSU 824 can be allocated across all running cores with the objective of maximizing the overall workload performance. At the front end, both load current and voltage are measured via I/V sensors 827 and the results are fed-back to a SolarCore controller 830, which is responsible for identifying and tracking the maximal power point of the PV panel 803. The Solar-Core controller 830 adjusts the tunable power-conservative matching network 818 (e.g., a DC/DC converter) through an MPPT control signal 833 and communicates with the multi-core processors through an adapter 836, which is responsible for per-core load tuning and workload performance optimization. For example, performance of the multi-core processors may be evaluated based upon performance counters of the cores.

As described below, the solar energy management control can be decomposed into multi-core aware MPP tracking and dynamic load adaptation. In one embodiment, per-core dynamic voltage/frequency scaling (DVFS) and per-core power gating (PCPG) is used for load adaptation on multi-core chips. One purpose of performing load adaptation is to move the solar array operating point close to the MPP under changing atmospheric conditions. To achieve the per-core DVFS, an on-chip voltage-regulator module (VRM) can be used for each core to provide the appropriate supply voltage. A DVFS mode register may be used to check or set the DVFS for the core. The corresponding supply voltage is communicated between the SolarCore controller 830 and the VRMs and cores via a number of bits called a Voltage Identification Digital (VID), which has been implemented in commercial microprocessors. For example, the Intel Xeon processor employs a 6-bit VID to specify the input voltage from 0.8375 to 1.6V DC with 32 different voltage steps. Certain optimization methods can be employed to maximize workload performance under the variable maximal power budget.

In one embodiment, multi-core aware MPP tracking relies on successive tuning of both the tunable power-conservative matching network 818 (e.g., a DC/DC converter) transfer ratio k and the multi-core load w. The SolarCore controller 830 aims at coordinating the power supply converter 818 and the multi-core load adaptation to achieve a maximal power draw. In addition, the techniques employed in certain embodiments of SolarCore ensure a correct tracking direction and a stable load operating voltage $V_1$.

TABLE 1, reproduced below, summarizes electrical behavior of load tuning. Tuning k or w may increase output power $P_{out}$, load voltage $V_1$ and/or load current $I_1$, depending on the location of the operating point. By simultaneously adjusting k and w, the output current may be increased while maintaining a constant output voltage. As a result, the operating point moves closer to the MPP and the multi-core processor can utilize more power.

TABLE 1

The characteristics of load tuning
($P_{out}$, $V_l$ and $I_l$ are DC/DC output)

| Position | Operation | Power | Load voltage | Load current |
|---|---|---|---|---|
| Left of MPP | k ↑ (const. load) | $P_{out}$ ↑ | $V_l$ ↑ | $I_l$ ↑ |
| | w ↑ (const. transfer ratio) | $P_{out}$ ↓ | $V_l$ ↓ | $I_l$ ↑ |
| | k ↑ + w ↑ | $P_{out}$ ↑ | $\Delta V_l \approx 0$ | $I_l$ ↑ |
| Right of MPP | k ↓ (const. load) | $P_{out}$ ↑ | $V_l$ ↑ | $I_l$ ↑ |
| | w ↑ (const. transfer ratio) | $P_{out}$ ↑ | $V_l$ ↓ | $I_l$ ↑ |
| | k ↓ + w ↑ | $P_{out}$ ↑ | $\Delta V_l \approx 0$ | $I_l$ ↑ |

Figure 9:
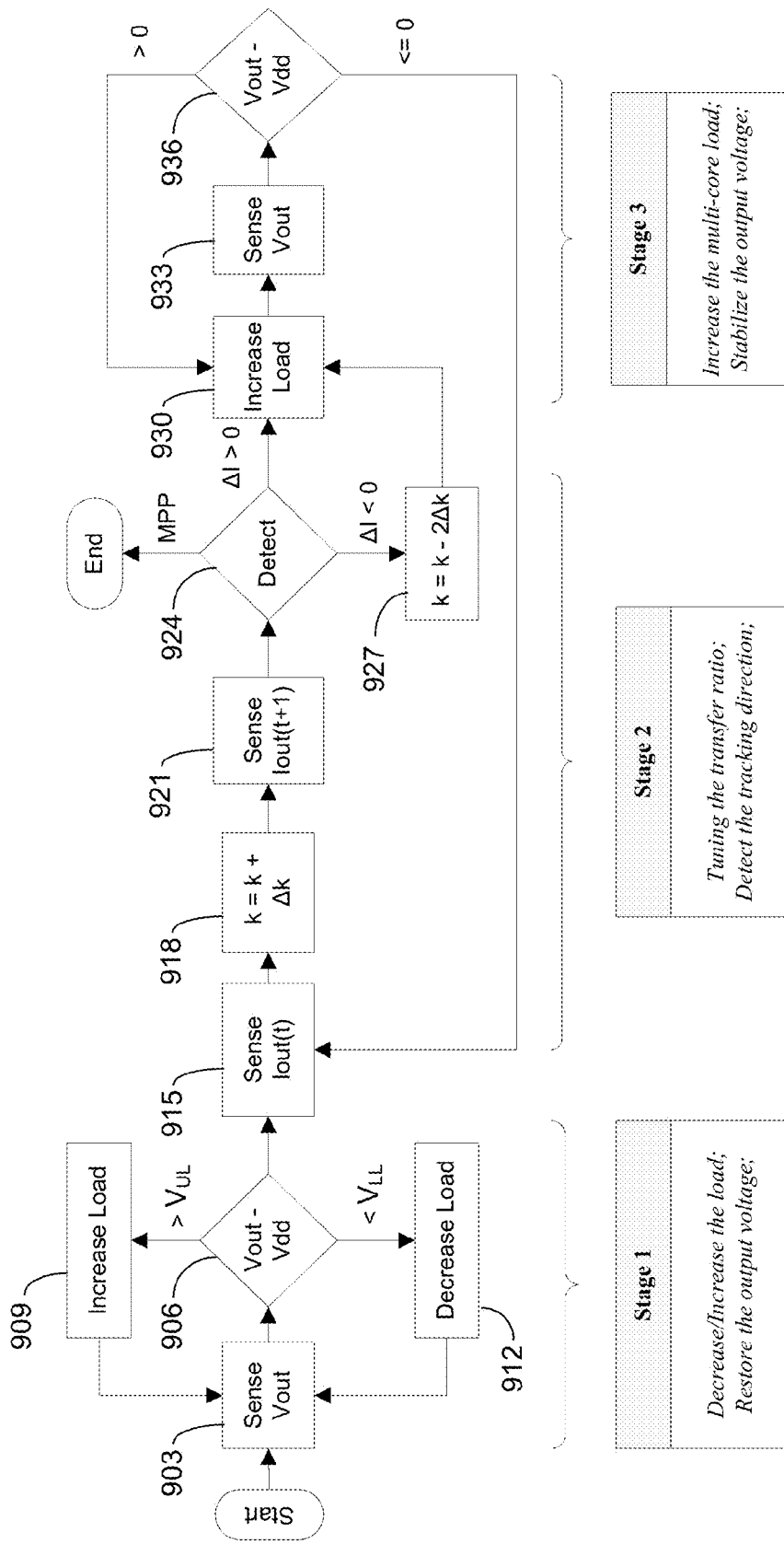
FIG. 9 is a flowchart illustrating of an example of renewable energy control pertaining to MPP tracking.

Referring to FIG. 9, shown is a flowchart illustrating an example of MPP tracking. The embodiment of FIG. 9 includes a three-stage control strategy to perform MPP tracking. In particular, the flow starts with a normal operating voltage (i.e. $V_1 = V_{dd}$). Due to supply variations, $V_1$ may not equal to $V_{dd}$ at each beginning phase of periodically triggered MPP tracking. In stage 1, the SolarCore controller restores the output voltage to $V_{dd}$ by decreasing or increasing the load to an appropriate level. This stage avoids system overloading and serves as preparation for the following tuning stages. Beginning with 903, the output voltage ($V_{out}$) of the tunable power-conservative matching network 818 is sensed and compared to the desired load voltage ($V_{dd}$) in 906. The difference ($V_{out} - V_{dd}$) may be compared to upper and lower limits ($V_{UL}$ and $V_{LL}$) about $V_{dd}$ to determine whether to adjust the load. For example, the limits may be set so that $V_{out}$ is adjusted to within a range about $V_{dd}$ defined by $V_{UL}$ and $V_{LL}$ and/or equals $V_{dd}$. In the example of FIG. 9, if the difference ($V_{out} - V_{dd}$) is greater than the upper limit ($V_{UL}$) then the load is increased in 909 and $V_{out}$ is sensed again in 903, if the difference ($V_{out} - V_{dd}$) is less than the lower limit ($V_{LL}$) then the load is decreased in 912 and $V_{out}$ is sensed again in 903, and if $V_{UL} \geq (V_{out} - V_{dd}) \geq V_{LL}$ then the flow proceeds to 915 of the next stage. In some implementations, $T_U$ and $T_L$ may both be set to zero, in which case $V_{out}$ is adjusted to equal $V_{dd}$.

In stage 2, the transfer ratio k is tuned. As TABLE 1 shows, the transfer ratio tuning direction that approaches MPP depends on the system's current operating position. To determine the tuning direction, certain techniques are employed that set the transfer ratio of the tunable power-conservative matching network 818 (e.g., a DC/DC converter) from k to k+Δk and observe the output current ($I_{out}$). An increase in output current suggests that the PV panel generates more power and the PV system is approaching the MPP. In this case, the actual operating point is on the left side of the MPP as illustrated in FIG. 5B. On the other hand, a decrease in output current suggests a wrong tuning direction. In this case, the transfer ratio is decreased by 2Δk, which results in a net change of −Δk in transfer ratio. Consequently, the method resumes the correct tuning direction and proceeds to the third stage to perform load matching.

In FIG. 9, when $T_U \geq (V_{out} - V_{dd}) \geq T_L$ in 906, then the output current ($I_{out}$) of the tunable power-conservative matching network 818 is sensed in 915 at time t. The transfer ratio k is then increased by Δk (e.g., by changing the duty cycle of the PWM) in 918 and the output current ($I_{out}$) is again sensed in 921 at time t+1. In 924, the difference in the output currents ($\Delta I = I_{out}(t+1) - I_{out}(t)$) is detected. If ΔI is greater than zero, then the load is increased in 930 of the next stage for load matching at the adjusted k. If ΔI is less than zero, then the transfer ratio k is decreased by 2Δk in 927 before the load is increased in 930 for load matching at the adjusted k. If ΔI is equal to zero, then the PV panel is operating at the MPP. In that case, the process may restart or may return to block 915 to continue monitoring operation of the system.

In the third stage, the load is tuned until $V_1$ equals $V_{dd}$. Due to the adjustment of k in the second stage, the output voltage changes as well. By increasing the load, the PV operating point is changed and $V_1$ decreased until it reaches $V_{dd}$. In FIG. 9, after the load is increased in 930 (e.g., by incrementing the VID), the output voltage ($V_{out}$) of the tunable power-conservative matching network 818 is sensed in 933 and compared to the desired load voltage ($V_{dd}$) in 936. If the difference ($V_{out}$-$V_{dd}$) is greater than zero, then the load is increased again in 930. Otherwise, the flow returns to 915 to sense $I_{out}$.

During each control period, the load successively increased with the aid of tuning the transfer ratio k, as discussed with respect to the second and third stages. The load adaptation scheme used in the first and third stages is described further below. Through the stepwise tuning of transfer ratio and load matching, the example of FIG. 9 progressively adapts the multi-core power consumption and eventually reaches the new MPP. One goal of the SolarCore power management is appropriate coordination of the variable power supply and demand. The MPPT-aware power control is orthogonal to the underlying processor microarchitecture (e.g. out-of-order vs. in-order) and core-count (single-core/SMT vs. multi-core). For example, in the light of a single-core processor, the chip-level dynamic voltage/frequency scaling (DVFS) or microarchitecture resource adaptation may be used for load tuning.

Attention is now directed to using DVFS to perform successive load tuning. To be more specific, per-core DVFS is applied to manage multi-core power at a fine granularity and achieve more effective maximum power tracking. The processor dynamic power model assumed herein is $P=\alpha CV^2 f$. Assume the following: (1) the voltage scales approximate linearly with frequencies within typical operating ranges, i.e. $f_i = \mu V_i + \lambda$, $V_i \in \{V_1, V_2, \ldots V_n\}$, $i \in \{1, 2, \ldots, N\}$, where n is the number of voltage levels and N is the total number of cores; (2) the total power drawn by a core is approximately a cubic function of its voltage level, e.g. $P_i = \alpha CV_i^2(\mu V_i + \lambda) \approx a_i V_i^3 + c_i$; (3) the voltage scaling has little impact on instructions per cycle (IPC) and the throughput $T_i = IPC_i \times f_i$ of a core is proportional to its frequency; and (4) the available power for an individual core does not exceed its maximum power and all cores are homogeneous. Given the above assumptions, the per-core throughput may be expressed as $T_i = IPC_i \times (\mu V_i + \lambda) = b_i V_i + d_i$ and the average throughput across all cores can be expressed as $$\overline{T_i} = \frac{1}{N}\sum(b_i V_i + d_i).$$

Since the system working duration, which is subject to the solar power generation level, plays an important role in determining the overall performance, one goal is to maximize $\overline{T_i} \times$Runtime/day. This performance-time product (PTP) may be measured as the total instructions committed per day. To maximize the PTP, both the throughput and the system operation duration are increased.

In contrast to conventional power management problem, the solar power budget is not fixed, i.e., $P_{total}=\Sigma P_i=\Sigma(a_i V_i^3 + c_i) \leq P_{MPP}=f(I,T)$, where I and T is the sun irradiance and environment temperature, respectively. The unpredictable nature of the PV output makes performance optimization much more challenging. In one embodiment, throughput-power ratio (TPR) optimization is employed, which is a cost-effective PTP optimization that may be performed along with load adaptation. The throughput-power ratio specifies the throughput speedup of a processor when additional power is available. When adjusting the core voltage by $\Delta V$, a power consumption change of $\Delta P = 3a_i V_i^2 \Delta V$ occurs. The relationship between throughput change and voltage scaling can be given by $\Delta T = b_i \Delta V$. Hence the throughput power ratio can be defined as $$\frac{\Delta T}{\Delta P} = \frac{b_i}{3a_i V_i^2}.$$

Both $b_i$ and $a_i$ may be derived using profiling information obtained from the performance counters and the current/voltage sensors at each beginning of MPP tracking. Given the throughput power ratio, one scheme of certain SolarCore embodiments identifies the appropriate core voltage setting through a heuristic process. The cores that exhibit large TPR have higher priority to receive the available power.

Figure 10:
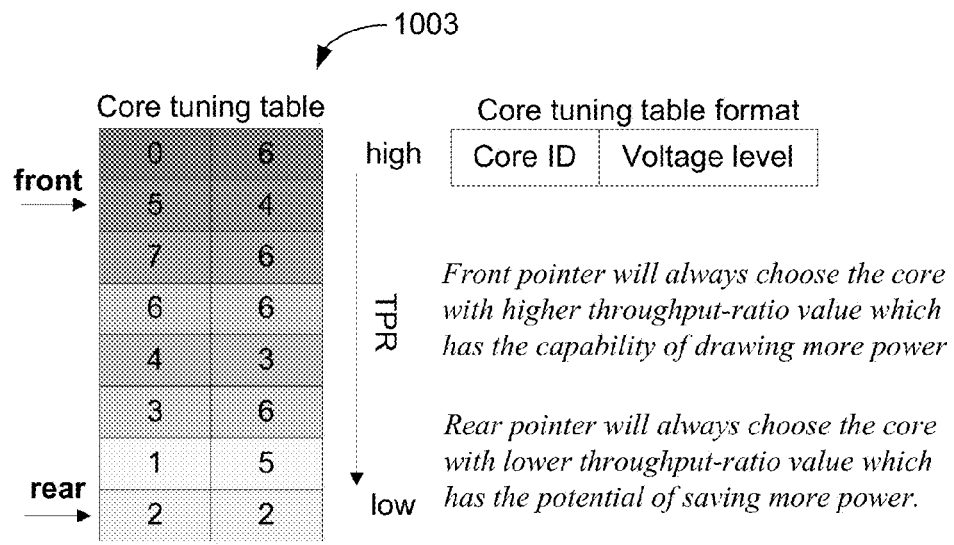
FIG. 10 is a schematic diagram that illustrates one embodiment of per-core load adaptation implemented by an embodiment of a renewable energy control system.

The core ID and per-core voltage level are stored in a core tuning table 1003 that may be sorted by the throughput-power ratio (TPR), as shown in FIG. 10. FIG. 10 illustrates an example of per-core load adaption policies. As described above, the MPPT either increases or decreases the load, depending on the output characteristics of PV panel. Each load tuning can be achieved by increasing or decreasing the voltage level and/or frequency of the selected core. When the load is increased, a core with a higher TPR is chosen, which maximizes the performance by using additional power. When the load needs to be decreased, a core with a lower TPR is chosen. Doing so decreases the multi-core power consumption to meet the power budget while minimizing the impact on the overall system performance. The above load adjustment is performed iteratively until the aggregated multi-core power approximates the new budget.

Figure 11:
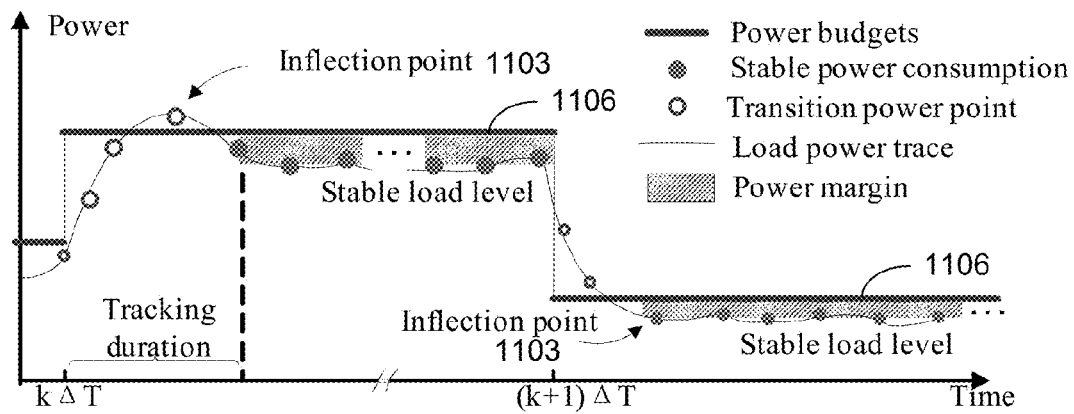
FIG. 11 is a schematic diagram that illustrates power as a function over time for one embodiment of the per-core load adaptation implemented by an embodiment of the renewable energy control system.
Figure 14A:
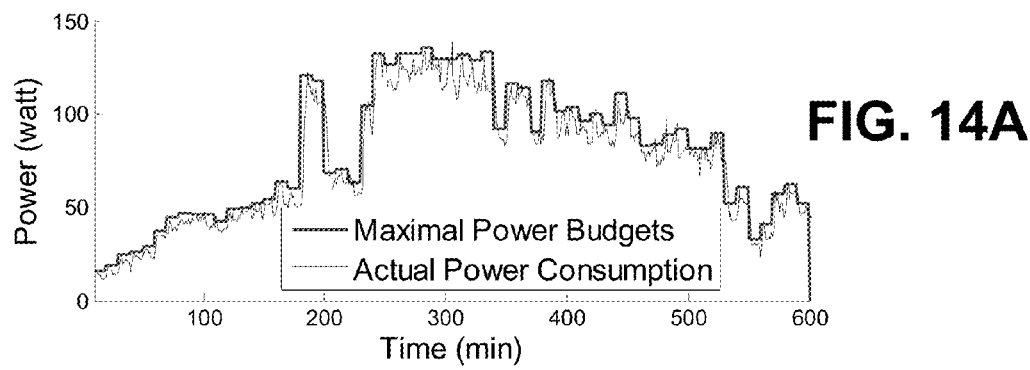
FIGS. 14A-14C are schematic diagrams that illustrate examples of MPP tracking accuracy for different workloads with fluctuating solar power generation.
Figure 14B:
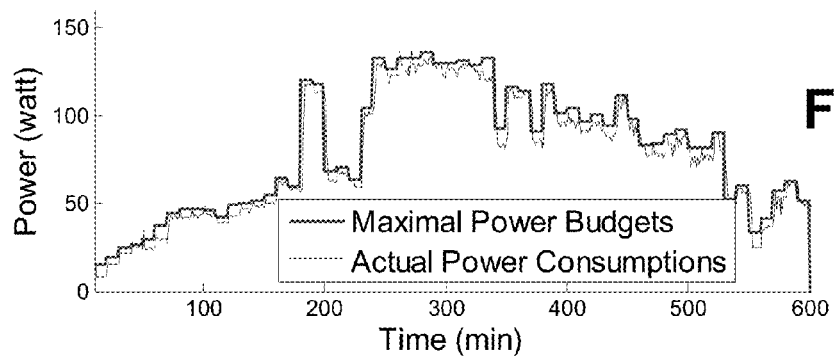
Figure 14C:
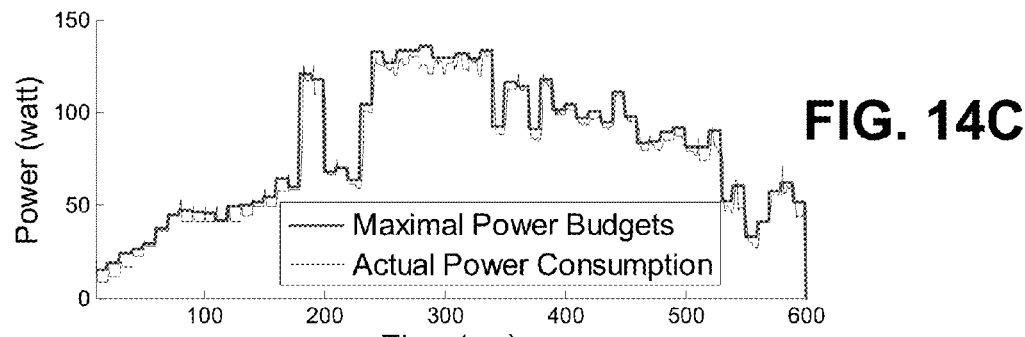

FIG. 11 shows an example of a per-core load adaptation scenario. The optimum load is achieved when the inflection point 1103 (the point where the slop of power trace changes sign) is reached. Since the inflection point 1103 may be stable operation states or transition states (depending on whether the inflection point 1103 is under the power budgets 1106), the MPPT should not stop tuning immediately once an inflection point is met. For example, if the inflection point 1103 is above the power budget, the MPPT can decrease the load further. As a result, the system returns back to the stable load level and the optimum power consumption is met. Note that the load adaptation cannot guarantee perfect utilization of the maximum power. On the other hand, the existence of a power margin is necessary since it improves the robustness of the system. FIG. 12 shows an example of pseudo code for per-core load tuning. When executed by a processor, it starts tuning the load when the controller detects a change in PV power supply. Successive load adaptation is performed at the beginning of each triggered tracking period.

Note that the disclosed run-time load adaptation optimization applies to other components although the tuning may vary. For example, the power tracking technique may be combined with dynamic disk speed control to adjust the storage current drawn so that the optimal power consumption may be achieved.

Evaluation of an embodiment of SolarCore was implemented through heavily extended simulators and real-world solar traces. The PV power model is built using the SPICE-based equivalent circuit simulations discussed above. The model takes irradiance and temperature profiles as inputs and generates the I-V and power profiles. The maximal power point tracking was validated using MATLAB and Simulink tool box before incorporating it into the architecture simulator.

Meteorological data from the Measurement and Instrumentation Data Center (MIDC) of National Renewable Energy Laboratory has been used. The MIDC provides real-time records from measurement stations located throughout the U.S. Those records cover a variety of meteorological data (e.g., irradiances, temperature, and wind speed) and have satisfactory accuracy. Locations that have different solar energy resource potentials were chosen for evaluation, as shown in TABLE 2. The SolarCore design was evaluated with daytime irradiance data (e.g., from about 7:30 am to about 5:30 pm) across different seasons (e.g., the middle of January, April, July and October in the year of 2009). MPP tracking was triggered at each 10-minute interval. What was observed was that the tracking duration within each interval is less than 5 ms. Sampling techniques were applied in the simulations to capture the irradiance changes at a large time scale.

The total solar energy drawn by SolarCore was compared with that of a battery-equipped standalone PV system. It was assumed that the battery was optimally charged using the MPPT circuit and the multi-core processor runs with full speed using stable power supply. Also assumed was that a dynamic power monitor was used to ensure that all the solar energy stored in the battery is consumed in the simulation. De-rating factors to estimate the upper bound of the utilization on conventional battery-equipped solar power systems were used. Typically, battery loss ranges from about 5% to about 25% and a modern maximum power tracking controller has conversion efficiency between about 93% to about 97%. Three levels of performance ranges were considered, as shown in TABLE 3.

TABLE 2

The evaluated geographic locations

| Station | Location | KWh/m²/day on average | Solar energy potential |
|---|---|---|---|
| PFCI | Phoenix, AZ | >6.0 | Excellent |
| BMS | Golden, CO | 5.0~6.0 | Good |
| ECSU | Elizabeth City, NC | 4.0~5.0 | Moderate |
| ORNL | Oak Ridge, TN | <4.0 | Low |

TABLE 3

Performance levels of battery-based PV systems

| Levels | High | Moderate (typical) | Low |
|---|---|---|---|
| MPP Tracking efficiency | 97% | 95% | 93% |
| Battery round-trip efficiency | 95% | 85% | 75% |
| Overall de-rating factors | 92% | 81% | 70% |
| Efficiency range | 81%~92% | 70%~81% | <70% |

A multi-core system was simulated using 8 Alpha 21264 processors, where each core has private L1 and L2 caches. A frequency of 2.5 GHz and a 90 nm technology with a maximum supply voltage of 1.45V was assumed. TABLE 4 summarizes an example of the core configuration. Also used was a cycle-accurate multi-core simulator integrated with the modified power models from Wattch and CACTI. Both dynamic and leakage power were modeled. It was assumed that the dynamic voltage and frequency scaling schemes employed in each core are similar to Intel's SpeedStep techniques: each core supports 6 frequency and voltage operating points and the frequency can be scaled from 2.5 GHz down to 1 GHz with steps of 300 MHz. The voltage scales approximate linearly with frequency within typical operating ranges; six voltages ranging from 1.45V to 0.95V with steps of 0.1V were used. To support DVFS, the Wattch and CACTI power models are extended to use the voltage and frequency as input and then adjust the power estimation for a core when the operating status changes. For the performance analysis, the performance-time products rather than IPC were used since the frequency varies across the entire program execution.

TABLE 4

Simulated machine configuration

| Parameter | Configuration |
|---|---|
| Frequency | 2.5/2.2/1.9/1.6/1.3/1.0 GHz |
| Voltage | 1.45/1.35/1.25/1.15/1.05/0.95 V |
| Width | 4-wide fetch/issue/commit |
| Issue Queue | 64 |
| ITLB | 128 entries, 4-way, 200 cycle miss |
| Branch Predictor | 2K entries Gshare10-bit global history |
| BTB | 2K entries, 4-way |
| Return Address Stack | 32 entries RAS |
| ROB Size | 98 entries |
| LSQ | 48 entries |
| Integer ALU | 4 I-ALU, 2 I-MUL/DIV, 2 Load/Store |
| FP ALU | 2 FP-ALU, 2 FP-MUL/DIV/SQRT |
| DTLB | 256 entries, 4-way, 200 cycle miss |
| L1 I-/D-Cache | 64 KB, 4-way, 64 B/line, 2 ports, 3 cycle access |
| L2 Cache | 2 MB, 8-way, 128 B/line, 12 cycle access |
| Memory Access | 64 bit wide, 400 cycles access latency |

Workloads from the SPEC2000 benchmark suite shown in TABLE 5 were used. All workloads were simulated using reference inputs. To form multi-programming workloads, a program's average energy-per-instruction (EPI) was used and the benchmarks were categorized as being high-EPI (EPI≥15 nJ), moderate-EPI (15 nJ≥EPI≥8 nJ), or low-EPI (EPI≤8 nJ). Each benchmark was run in their representative execution intervals and the EPI is obtained by calculating the average-energy consumed per-instruction. In TABLE 5, the High-, Moderate- and Low-EPI workloads (H1, H2; M1, M2; L1, L2) consist of 8 benchmarks from each category. The High-Moderate- and Moderate-Low-EPI workloads are formed using four benchmarks from each category. Both homogeneous and heterogeneous workloads were generated.

TABLE 5

The simulated multi-programmed workloads

| EPI | | | |
|---|---|---|---|
| High | H1(art × 8) | H2 (art × 2, apsi × 2, bzip × 2, gzip × 2) |
| Moderate | M1(gcc × 8) | M2 (gcc × 2, mcf × 2, gap × 2, vpr × 2) |
| Low | L1(mesa × 8) | L2 (mesa × 2, equake × 2, lucas × 2, swim × 2) |
| High-Moderate | HM1(bzip × 4, gcc × 4) | HM2 (bzip, gzip, art, apsi, gcc, mcf, gap, vpr) |
| Moderate-Low | ML1(gcc × 4, mesa × 4) | ML2 (gcc, mcf, gap, vpr, mesa, equake, lucas, swim) |

The efficiency of SolarCore with various power management policies was compared, as summarized in TABLE 6. The fixed-power is a non-tracking power management scheme which assumes a constant power budget during the entire workload execution. In contrast to SolarCore, MPPT&IC (individual core) and MPPT&RR (round robin) both apply tracking control techniques but employ different scheduling policies to perform load adaptation. To be more specific, MPPT&IC keeps tuning an individual core until reaching its highest or lowest V/F level while MPPT&RR tends to distribute the power budget variation evenly across all the cores in a round-robin fashion. The MPPT&Opt (which may be a default configuration for SolarCore) selects cores using the TPR optimization.

TABLE 6

The evaluated power management schemes

| Algorithm | MPPT | Load adaptation | Scheduling method |
|---|---|---|---|
| Fixed-Power | No | DVFS | Linear programming optimization with a fixed power budget |
| MPPT & IC | Yes | DVFS | Tuning individual core until reaching its highest/lowest V/F level |
| MPPT & RR | Yes | DVFS | Round-robin scheduling |
| MPPT & Opt | Yes | DVFS | Optimized scheduling based on throughput-power ratio |

Since the primary interest is green energy powered duration, the operation duration referred to in this disclosure is the daytime duration. In addition, the effective operation duration means the duration that the electrical load successfully draws power from the solar (PV) panel. During effective operation duration, SolarCore performs maximal power point tracking and workload run-time optimization. Due to the intermittency of a renewable resource, effective operation duration is shorter than the operation duration.

Drawing attention to the MPP tracking accuracy across different workloads, attention is directed to FIGS. 13A-13C and 14A-14C, which provide a graphic view of the tracking results. FIGS. 13A-13C and 14A-14C illustrate MPP tracking accuracy across different workloads. In each figure, the maximum power trace and the actual power extracted using MPP tracking is plotted. Results for regular (e.g., Jan @AZ) and irregular (e.g., July @AZ) weather patterns are presented in FIGS. 13A-13C and 14A-14C, respectively. As can be seen, the MPP tracking technique ensures that actual power consumption closely follows the ideal maximal power.

For high EPI workloads (e.g., H1), large ripples in power tracking are generated due to the high variation in load power. Power ripples, together with the unpredictable nature of the environment, affect the use of renewable energy and the system reliability. Low EPI workloads and heterogeneous workloads are observed to have small ripples, as can be seen in FIGS. 13B-13C and 14B-14C. The former manifests small power ripples since they have lower average energy per instruction, which results in relatively small power fluctuation amplitude; the latter exhibits small ripples because a mix of diverse workloads can smooth the power fluctuation and relatively steady power consumption is obtained.

The dynamic load adaptation scheme of certain SolarCore embodiments reduces the impact of load power ripples by leaving a small power margin between the actual load power consumption and the solar power budget. This power margin slightly degrades the tracking accuracy but improves the reliability. To quantify the impact of power margin on the tracking accuracy, the relative tracking error was calculated. In each tracking period t, the relative tracking error is defined as $\bar{\eta}=|P-P'|/P'$, where P is the actual power consumption and P' is the power budget. TABLE 7 shows the geometric mean of the errors on each geographic location across different weather patterns. Due to the reduced power margin, the low EPI workloads (e.g., L1) show relatively small tracking errors. Similarly, compared with H1, heterogeneous workloads (e.g., HM2) also have small tracking error as well.

TABLE 7

The average relative error

| | | Homogeneous | | | Less | | Less heterogeneous | | | Heterogeneous | |
|---|---|---|---|---|---|---|---|---|---|---|---|
| | | H1 | M1 | L1 | HM1 | ML1 | H2 | M2 | L2 | HM2 | ML2 |
| AZ | Jan | 10.0% | 9.2% | 7.7% | 8.9% | 7.1% | 8.5% | 7.4% | 8.4% | 6.9% | 7.6% |
| | Apr | 12.6% | 9.2% | 8.3% | 10.6% | 9.3% | 10.7% | 9.3% | 9.0% | 10.2% | 8.3% |
| | Jul | 10.0% | 7.3% | 7.7% | 9.0% | 7.6% | 9.6% | 7.1% | 7.0% | 7.9% | 6.8% |
| | Oct | 9.8% | 7.8% | 7.7% | 8.6% | 8.0% | 7.0% | 7.6% | 7.4% | 7.4% | 6.6% |
| CO | Jan | 14% | 11.3% | 10.8% | 12.0% | 10.6% | 11.2% | 10.0% | 9.2% | 9.0% | 11.3% |
| | Apr | 13.2% | 8.9% | 7.8% | 10.8% | 7.5% | 9.7% | 8.0% | 6.8% | 9.8% | 8.9% |
| | Jul | 10.1% | 8.2% | 7.6% | 8.9% | 7.9% | 8.5% | 7.6% | 6.6% | 8.1% | 6.5% |
| | Oct | 12.1% | 9.2% | 7.9% | 9.2% | 8.1% | 9.5% | 8.6% | 7.8% | 8.1% | 7.0% |
| NC | Jan | 13.0% | 10% | 11.4% | 12.4% | 10.4% | 11% | 8.9% | 10% | 13.3% | 9.3% |
| | Apr | 22.0% | 17% | 19% | 18.5% | 16.4% | 21% | 14.3% | 16.3% | 16.3% | 13.8% |
| | Jul | 11.6% | 8.3% | 5.7% | 8.6% | 5.4% | 7% | 4.4% | 4.0% | 4.9% | 4.5% |
| | Oct | 15.4% | 14.1% | 12.0% | 14.3% | 12.1% | 14.2% | 12.5% | 11.9% | 13.3% | 11.1% |
| TN | Jan | 10% | 8.2% | 6.6% | 8.0% | 6.00% | 13.2% | 6.1% | 7.4% | 9.0% | 8.7% |
| | Apr | 15.1% | 14.4% | 15.3% | 16% | 14% | 13.1% | 12.9% | 13% | 14.4% | 12.9% |
| | Jul | 13.4% | 9.7% | 8.5% | 9.4% | 8.5% | 13% | 9.0% | 8.2% | 7.7% | 7.6% |
| | Oct | 18.0% | 13.8% | 14.3% | 14.7% | 13.3% | 12.9% | 11.9% | 13.4% | 12.7% | 11.6% |

EPI:  High ──▶ Low

For the direct-coupled PV systems, the load starts to operate using solar power when the amount of renewable energy exceeds a power-transfer threshold. The solar energy utilization on multi-core systems that use a power-transfer threshold as a fixed power budget was evaluated. This fixed power budget ensures that the multi-core systems operate reliably with sufficient power. If the power supply from renewable power source falls below the power-transfer threshold, the multi-core system switches to the secondary power source (e.g., a grid utility).

Both homogeneous and heterogeneous workloads with high and low EPI were simulated. For each weather pattern, the effective operation duration under different power budget thresholds was calculated, as shown in FIGS. 15A-15C.

Figure 15A:
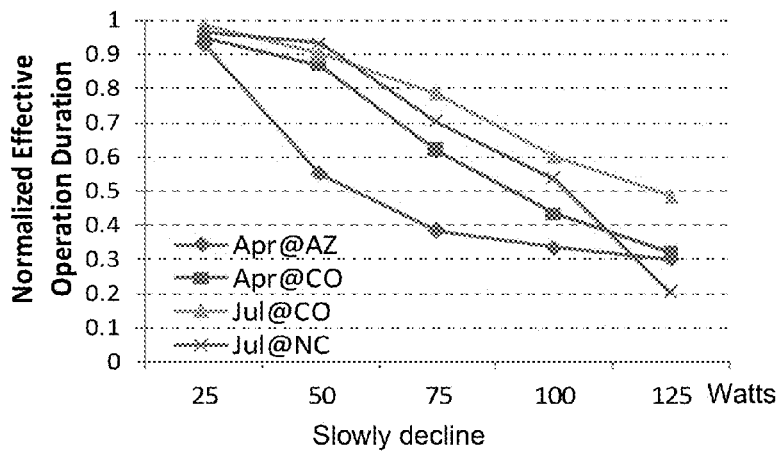
FIGS. 15A-15C are schematic diagrams that illustrate examples of operation durations on different power budget thresholds.
Figure 15B:
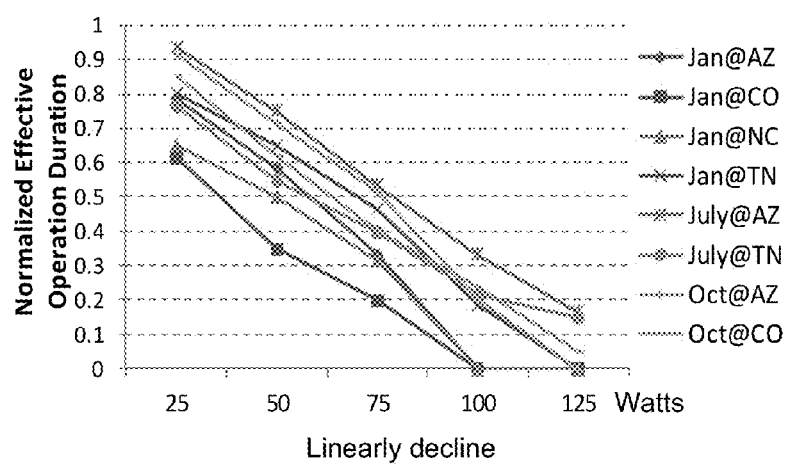
Figure 15C:
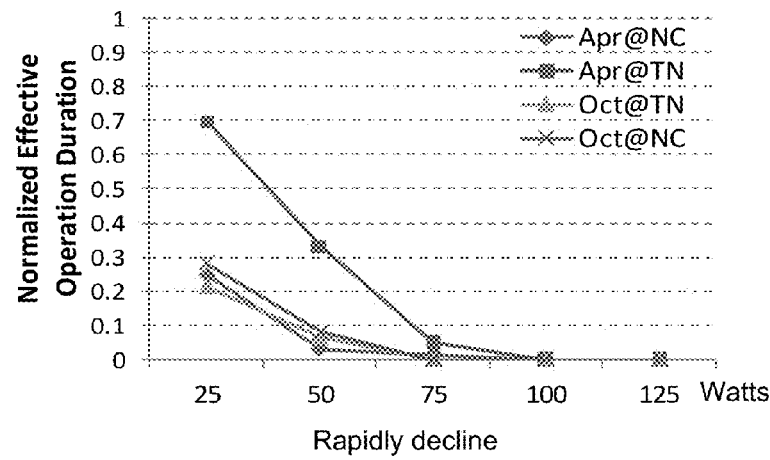
Figure 17B:
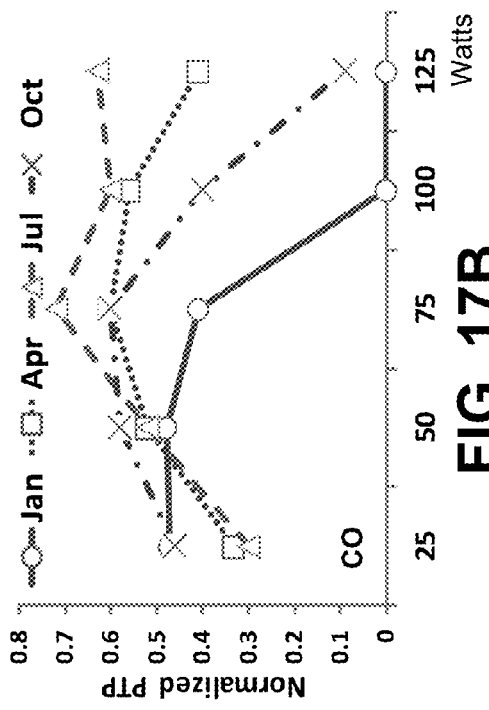
FIGS. 17A-17D are schematic diagrams that illustrate examples of normalized performance time product (PTP) under different fixed power budgets.
Figure 17D:
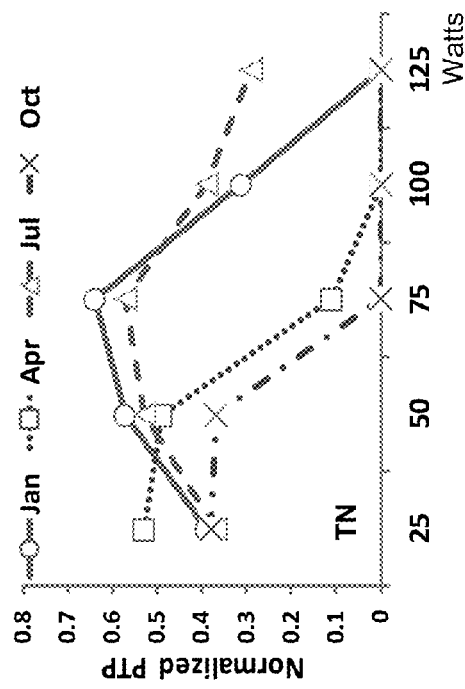
Figure 17A:
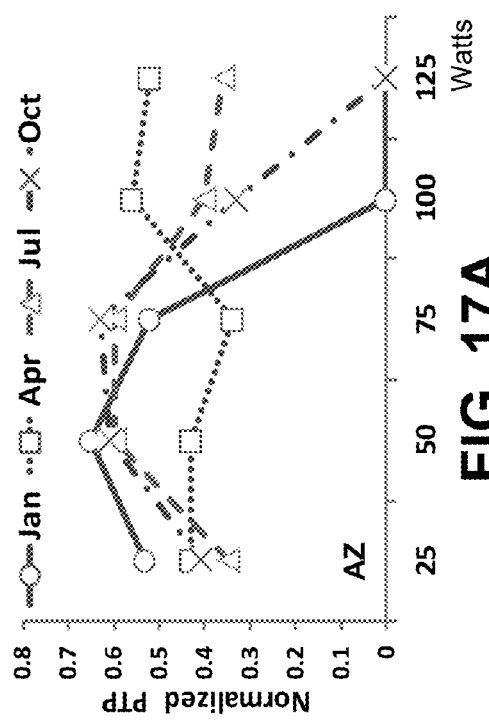
Figure 17C:
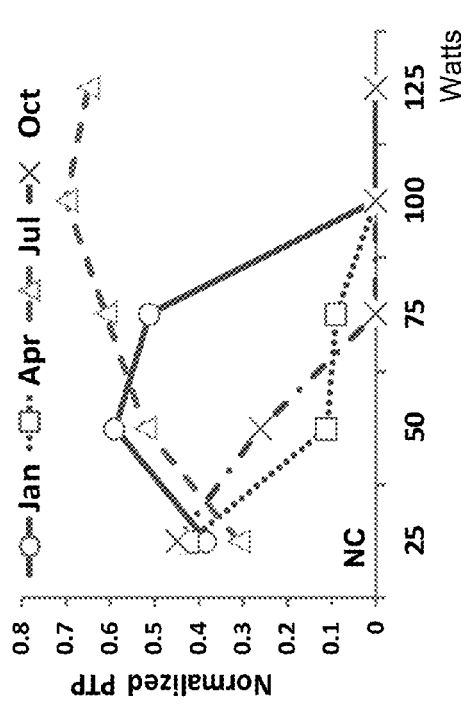

FIGS. 15A-15C illustrate operation durations on different power budget thresholds Watts. The operation duration may decline slowly, linearly or rapidly. The threshold affects processor performance-time product (PTP) in both throughput and effective operation duration. A higher power-transfer threshold makes the multi-core processor run at higher voltages and frequencies but only for short durations. A conservative, low power-transfer threshold operating mode has longer duration but lower clock frequencies. Intuitively, the processor should run under higher (lower) power budget to maximize its performance when the effective operation duration declines slowly (rapidly). Extensive simulations shown in FIGS. 16A-16D and 17A-17D further substantiate this.

FIGS. 16A-16D illustrate examples of normalized solar energy usage under different fixed power budget and FIGS. 17A-17D illustrate examples of normalized PTP under different fixed power budget. The accumulated energy drawn by the multi-core processor and the performance in terms of PTP were calculated. All the results are normalized to those obtained on SolarCore. As shown in FIGS. 16A-16D and 17A-17D (average results across all benchmarks), the maximal solar energy drawn does not guarantee maximal performance (e.g., July @CO and April @TN). The maximal workload performance may occur under a high power budget (e.g., April @AZ), a moderate power budget (e.g., January @TN) or even a low power budget (e.g., April @NC). Therefore, a single, optimal fixed power budget for the multi-core system does not exist. Even under the optimal fixed power budget, the best energy utilization and PTP that the Fixed-Power schemes can achieve is less than 70% of that yielded on maximum power tracking. In other words, SolarCore outperforms the fixed-power control scheme by at least 43% (i.e., (100%−70%)/70%) in terms of both energy utilization and workload performance.

Figure 18:
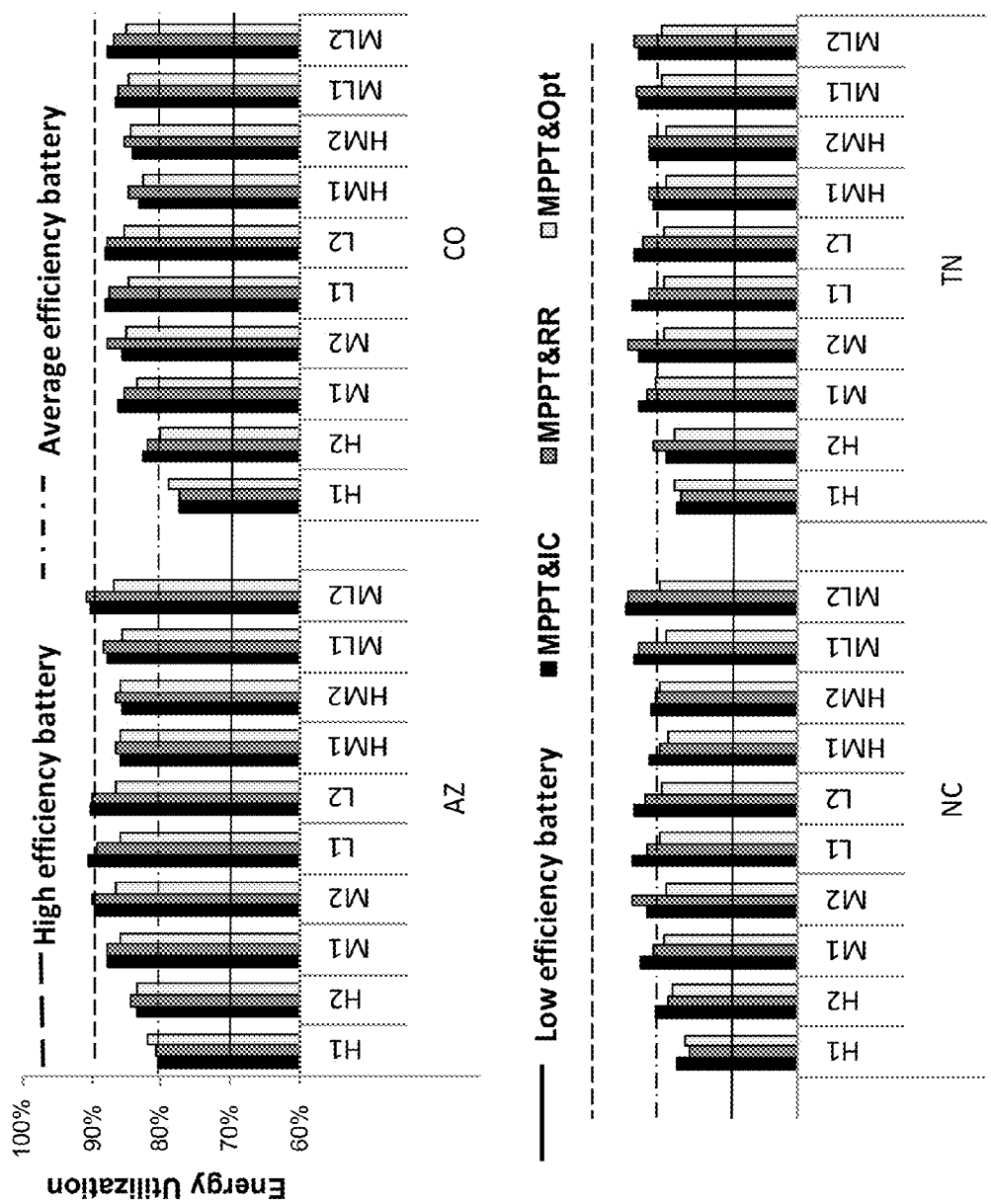
FIG. 18 is a schematic diagram that illustrates an example of average energy utilization across different geographical locations.

The energy utilization of SolarCore depends on the solar resource potential of the geographic location. When the PV generation is too low to power the load, SolarCore draws power from the utility via a transfer switch and the multi-core processor acts as a traditional CMP. The energy utilization (i.e., actual total solar energy consumed/theoretical maximum solar energy supply) was calculated with various load adaptation scenarios. FIG. 18 illustrates examples of average energy utilization across different geographical locations. The upper bound of utilization on battery-based systems is estimated using de-rating factors. As shown in FIG. 18, the average solar energy utilization drops when the renewable resource potential is low (e.g., TN). For locations with abundant solar resource (e.g., AZ), SolarCore draws 5% more power compared to a typical battery equipped PV system which has an energy utilization upper bound of 81%.

Figure 19:
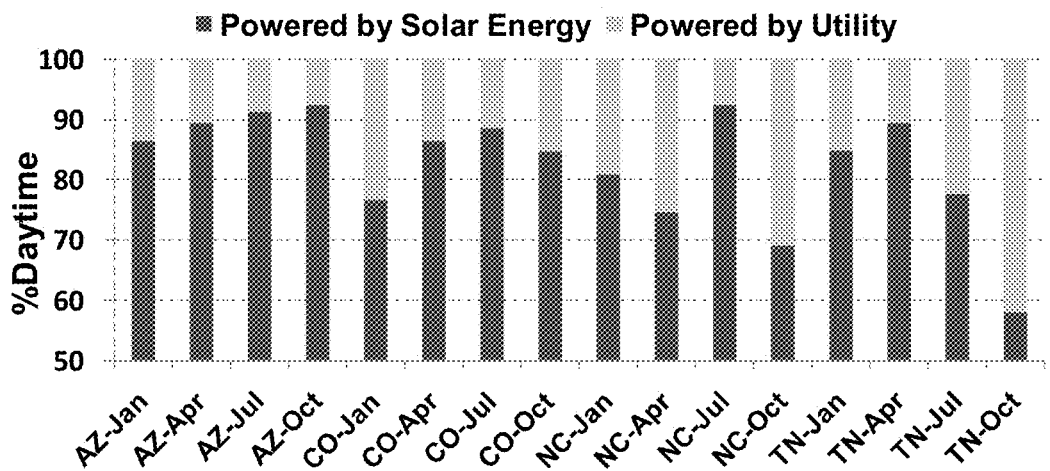
FIG. 19 is a schematic diagram that illustrates an example of effective operation duration of an embodiment of a renewable energy control system under different weather patterns.
Figure 20:
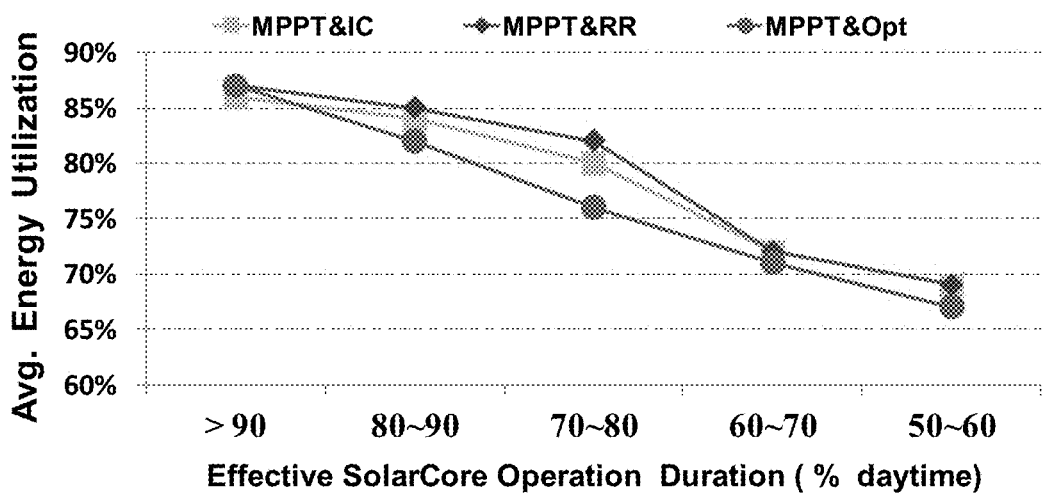
FIG. 20 is a schematic diagram that illustrates an example of average solar energy utilization under different tracking durations.

The primary reason of low energy utilization in NC and TN is that long effective operation duration cannot be guaranteed. FIG. 19 illustrates an example of the effective operation duration of SolarCore under different weather patterns. As shown in FIG. 19, the effective operation duration ranges from 60% to 90% during the daytime, depending on the weather patterns. The effective operation duration in AZ is always longer and therefore, the average energy utilization is higher. FIG. 20 shows the average energy utilization with different effective SolarCore operation duration (under different tracking durations). The solar energy utilization decreases significantly if SolarCore has to be powered by the backup supply for a long duration (e.g. October @NC and October @TN). Given that 80% of the daytime is operated using power tracking, SolarCore can guarantee 82% or more solar energy utilization on average.

In addition to the weather patterns, different load adaptation methods and workload characteristics affect the utilization as well. In FIG. 18, it is observed that MPPT&Opt load adaptation method has 2.6% lower energy utilization compared with that of MPPT&RR. This is because MPPT&Opt relies on successively tuning low-power, high-throughput cores to improve the performance. The optimization method that MPPT&Opt used implicitly reduces the overall load energy consumption while improving the overall performance. Compared with the high EPI workloads, low EPI workloads exhibit higher energy utilization due to the fine-grained load power tuning and the reduced power margin. By increasing the granularity of DVFS level, one can increase the control accuracy of MPPT and the power margin can be further decreased without significantly affecting the MPPT robustness.

Figure 21:
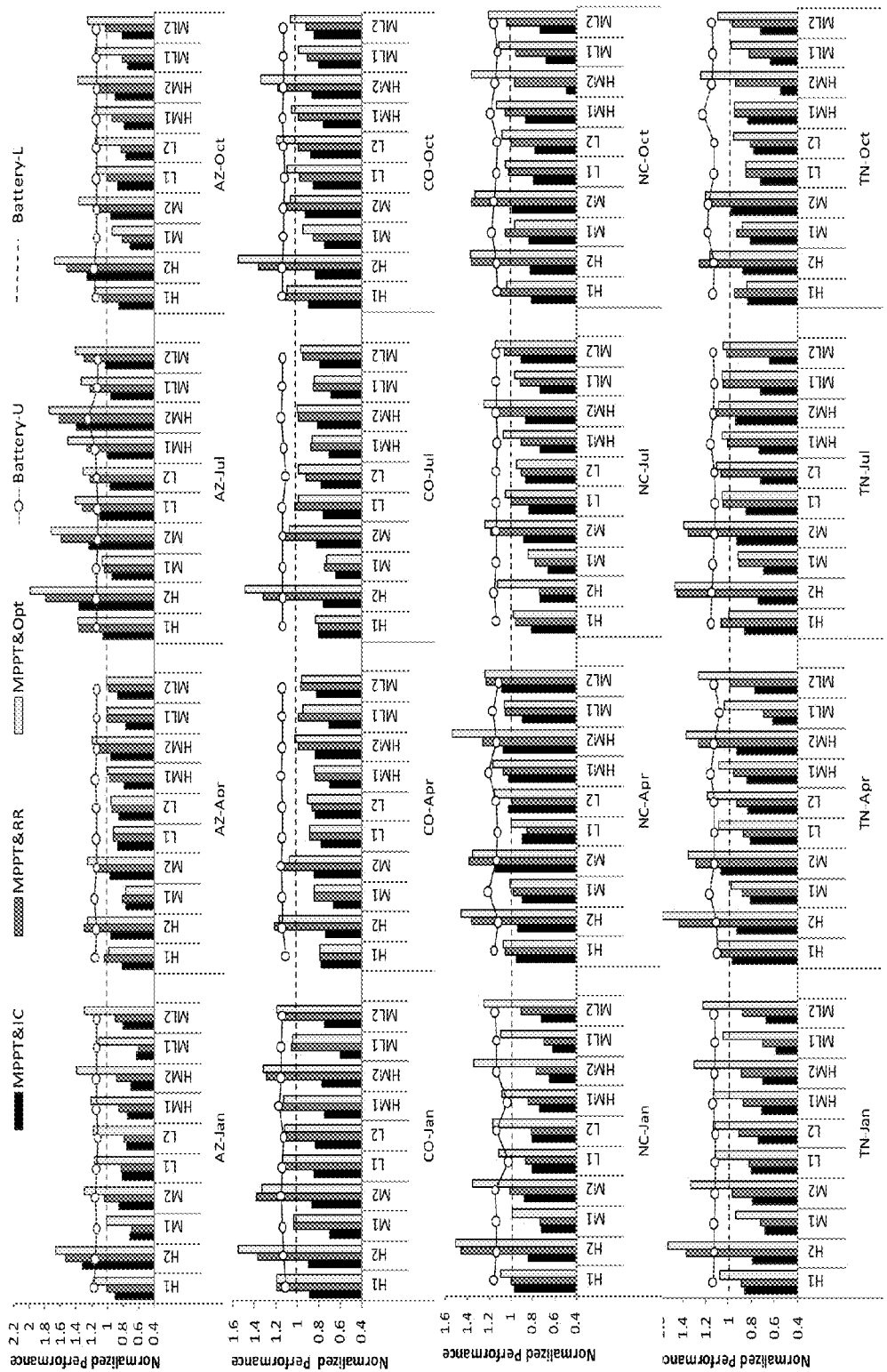
FIG. 21 are schematic diagrams that illustrate examples of normalized PTP with different load scheduling methods.

SolarCore was compared with the high efficiency battery-equipped systems. FIG. 21 illustrates examples of the normalized performance time product (PTP) with different load scheduling across different weather patterns. Battery-L denotes the lower bound of a high-efficiency battery-equipped system, which has a total energy conversion efficiency of 0.81. Battery-U denotes the upper bound of a high-efficiency battery-equipped system, which has a total energy conversion efficiency of 0.92. All the results were normalized to Battery-L.

In FIG. 21, MPPT&IC shows the lowest performance because it concentrates the solar power into fewer cores. The throughput-power ratio $$\frac{\Delta T}{\Delta P} = \frac{b_i}{3a_i V_i^2}$$

shows that the performance return decreases when there is allocation of the limited available power to those high V/F level cores. MPPT&RR increases the performance by distributing the solar power to each individual core in a round-robin fashion. In this case, each core runs in a moderate V/F level with a relatively high performance per watt. The average normalized performance of MPPT&IC, MPPT&RR and MPPT&Opt is 0.82, 1.02 and 1.13, respectively. The normalized performance of Battery-U is 1.14. As can be seen, with runtime throughput-power ratio optimization, MPPT&Opt improves the performance by 37.8% compared with MPPT&IC and 10.8% compared with MPPT&RR. Compared with the most efficient battery-based MPPT systems, SolarCore yields less than 1% performance degradation. Moreover, SolarCore is environmental friendly and does not have the life-time problem as the expensive battery-equipped PV systems.

Certain features in the use of SolarCore systems include the joint optimization of solar energy utilization and workload performance, and the potential to operate autonomously without relying on complex control or energy storage elements.

Conventional multi-core power management techniques assume constant power supply and therefore they are largely workload-driven. The goals of these techniques are either reducing power consumption by improving power efficiency or maximizing the performance under limited power supply. Different from conventional energy source, solar energy is not a constant power source and the solar power generated can vary significantly with different loads.

Computer systems operated using energy generated from conventional fossil fuel increase the total cost of ownership and impact the environment. Clean and renewable energy sources such as photovoltaic power generation are one of the most promising technologies for the future of green computing in IT infrastructures. Unlike conventional energy sources, PV modules exhibit non-linear I-V characteristics and their output power changes with the variation of light intensity and ambient temperature. Therefore, the best design practice of solar energy driven high performance computing system requires appropriate power provisioning control to harvest the renewable energy and reduce the impact of supply variation and dedicated load adaptation schemes that optimize the workload performance.

SolarCore provides a novel power management scheme for solar energy driven multi-core processors. While existing techniques seek to minimize multi-core power dissipation under performance constraints or to maximize throughput for a given power budget, the techniques employed by certain embodiments of SolarCore harvest the maximum amount of solar energy to maximize the power budget for optimal throughput without using short lifetime and expensive storage elements. Furthermore, SolarCore applies load optimization based on the workload throughput-power ratio to ensure that the dynamic load tuning across multiple cores approaches optimal performance. Because of its ability to extract additional solar energy and its ability for load optimization, SolarCore boosts multi-core processor performance by 43% compared with conventional fixed power budget scheme and 10.8% compared with round-robin load adaptation.

Having described the SolarCore embodiment, attention is now directed to the iSwitch embodiments previously referenced. As a background, cloud computing is redefining the IT infrastructure. Data centers have become essential to the operation of businesses, service providers, academic, and governmental institutions. Nevertheless, power-provisioning is challenging data center designers, as the environmental impact of IT becomes a growing concern worldwide. It has been shown that data centers account for approximately 3% of the total US electricity consumption by 2011. In a recent report on the carbon impact of cloud computing, the environmental activist group Greenpeace called on data center operators to make renewable energy a priority as more data centers are being built to meet the needs of cloud resources. In addition, the government also imposes a "carbon tax" on energy-hungry IT companies while giving federal tax credit (e.g., 30% to the total cost) for using renewable energy systems. Consequently, there has been an increasing push toward a renewable energy-driven, sustainable system design.

In the description that follows, a data center design scheme is disclosed that integrates on-site renewable energy sources into the data center infrastructure. Such a design scheme may draw considerable attention as the IT industry is starting to assume responsibility for supporting long-term computing system sustainability. Internet giants, such as Google, Microsoft and Yahoo! all power part of their data centers using renewable energy resources. Using grid utilities as backup, many Web Hosting service providers power their data centers with on-site renewable energy sources as well. With those green computing initiatives, each data center can eliminate a significant portion of their carbon dioxide emissions per year.

While many research efforts are focused on reducing idle server power, lowering provisioned power capacity, and optimizing power allocation, designing renewable energy powered data centers is still challenging and requires careful exploration. Due to the intermittent nature of renewable energy, most designs typically use on-site renewable generation to compensate part of their total data center power requirement. When renewable energy contributes a large portion of the load power demand (e.g., >15%), variations in renewable power supply have a significant impact on load operation. The opportunity to harvest renewable generation is missed by assuming a fixed and predictable power supply.

Figure 22A:
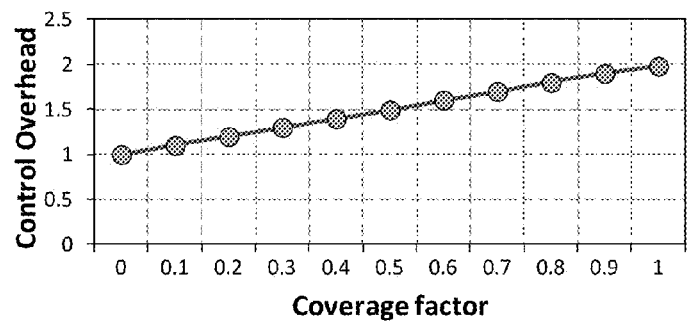
FIGS. 22A-22B are schematic diagrams that illustrate examples of power management overhead versus renewable energy utilization.
Figure 22B:
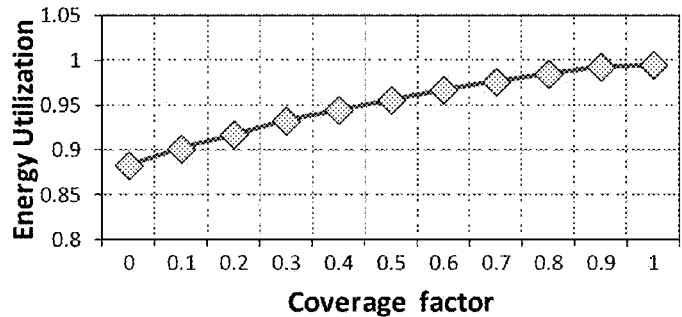

FIGS. 22A and 22B show examples of the tradeoff observed between power management (or tuning) overhead and renewable energy utilization. The evaluated system tracks the renewable power budget whenever renewable generation decreases (to avoid brownout); it tracks the power supply surge with a pre-defined coverage factor (CF). As shown in FIG. 22A, compared to no-tracking (i.e., CF=0), always tracking the power surge or increase (i.e., CF=1) increases the load tuning overhead by 2×. Nevertheless, the range of energy utilization return is less than 15%, as shown in FIG. 22B.

In the present disclosure, the design tradeoffs between energy utilization and load tuning overhead are evaluated in renewable energy driven computing systems. Certain embodiments of iSwitch provide a power management scheme that maintains a desirable balance between renewable energy utilization and data center performance. In one embodiment, iSwitch is a supply-aware power management scheme. It applies the appropriate power management strategy for wind variation scenarios to achieve the best design tradeoff. Further, iSwitch has a built-in supply/load cooperative optimization mechanism that is able to minimize the performance degradation due to load power tuning overhead while still maintaining high renewable energy utilization and low cost.

As is further detailed below, certain embodiments of iSwitch comprise a control architecture that provides an application-independent hierarchical control that leverages load migration to best utilize the renewable energy generation. Characterization of renewable power variability and data center load fluctuation reveals that power tracking may be done in a less frequent, light-weight manner. In this case, the load tuning overhead may be significantly reduced with negligible efficiency degradation. In some embodiments, supply/load cooperative optimization is provided that not only avoids redundant load tuning activities invoked by severe renewable power supply variation, but also minimizes unnecessary power control activities invoked by stochastic data center load fluctuation. Compared to the state-of-the-art renewable energy-driven designs, certain embodiments of iSwitch may reduce job waiting time by 80%, mitigate average network traffic by 75%, and rush hour traffic by 95%. Moreover, iSwitch can still maintain 96% of the energy efficiency. Note that the performance measures are not intended to be limiting, and that other measures may be achieved.

Digressing briefly, renewable energy supply (RES) is drawing growing attention in today's IT industry. In spite of the intermittent nature of renewable energy sources, designing renewable energy powered data centers has many benefits beyond a low carbon footprint. For instance, renewable power supplies are highly modular in that their capacity and can be increased incrementally to match load growth. This greatly reduces the over-provisioning loss of a data center since it may take a long time for the server load to catch up with the upgraded provisioning capacity. In addition, the latency between initiation and construction (or construction lead-time) of renewable generation may be significantly shorter than those of conventional power plants, reducing the financial and regulatory risks. Moreover, the price and availability of renewable resources remain stable, simplifying long-term planning for IT companies.

Conventionally, extra-scale battery farms may be used to regulate renewable power supply fluctuations. Such an approach may require large additional capital investments and may not be energy-efficient: the round-trip energy loss of batteries ranges between about 5% to about 25%. Furthermore, frequent charging and discharging of the battery accelerates its aging and quickly wears it out, which may further increase the environmental burden (e.g., a recycling problem) and the downtime for maintenance.

Alternatively, feedback mechanisms such as net-metering directly connects on-site renewable energy source to the local utility grid to gain high power provisioning availability. Nevertheless, net-metering is still in its infancy stage and aggressively relying on it may be hazardous or otherwise detrimental to the utility operation. This is because grid operators may be forced to switch their power stations frequently between operation and spinning standby modes to meet the unexpected feedback power surge. In addition, to ensure stability, the maximum renewable power penetration of the transmission line also has a limit. In the foreseeable future, these considerations may present a major hurdle for going green. Waiting for the grid to be "smart" may unnecessarily delay the long-term goal of sustainable IT.

With iSwitch, an IT facility can itself be an enabler of sustainability and efficiency. Instead of adding additional power provisioning units and server clusters, one technique of certain embodiments of iSwitch leverages existing data center infrastructure and load migration mechanisms to manage the time-varying renewable power. As an alternative to entirely relying on the power grid or energy storage, iSwitch exploits intelligent data center self-tuning to balance the power between utility grid and on-site renewable energy generation in a lightweight, efficient fashion. By reducing the dependence on large-scale batteries and utility power grids, iSwitch may improve data center sustainability with low cost while providing the operators with more active control of their server clusters.

In the present disclosure, renewable energy from wind power is explored since wind energy is cheaper and is also the most widely used renewable power technique for large scale facilities. In the section that follows, wind power characteristics are discussed, followed by a discussion of power management in wind energy driven data centers and the associated optimization opportunities.

Figure 23:
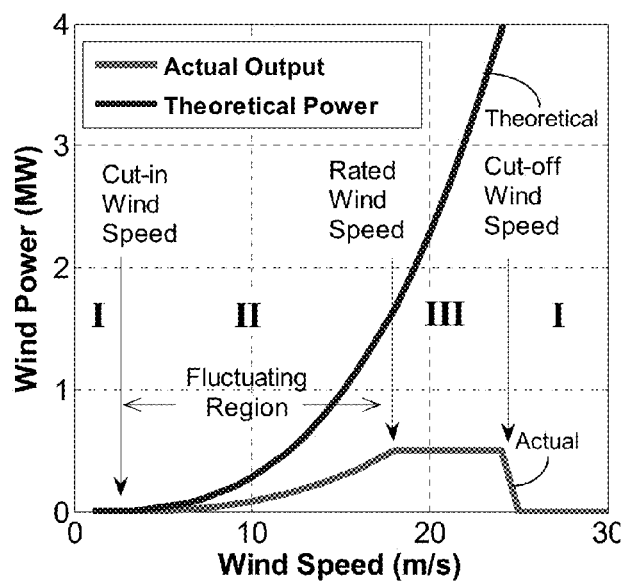
FIG. 23 is a schematic diagram that illustrates an example of a wind power-output characteristic.

A wind turbine generates electrical power by extracting kinetic energy from the air flow. While operating, the turbine converts wind energy to mechanical power through a rotor with multiple blades. FIG. 23 shows an example of the output characteristics of a wind turbine, whose power curve is divided into three regions by the designated operating wind speeds. The cut-in speed is the minimum speed at which the rotor and blade starts to rotate. The cut-off speed is the wind speed at which the turbine ceases its generation and shuts down for protecting the blade assembly. The cubic relationship between power and wind speed increases the output variability.

In FIG. 23, the three regions are referred to herein as an intermittent outage period (Region-I), variable generation period (Region-II) and stable generation period (Region-Ill), respectively. In Region-I, wind power is intermittently unavailable because the wind speed is either too low or too high. In Region-II, the mechanical power delivered to the turbine generator is given by $p=0.5\rho A v^3 C_p$, where $\rho$ is the air density, A is the swept area of the blades, v is the wind speed and $C_p$ is a power coefficient factor. In Region-III, the wind turbine operates at its designated rated power.

Figure 24:
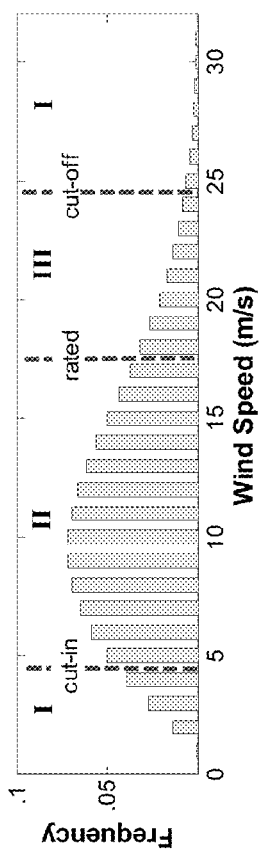
FIG. 24 is a schematic diagram that illustrates an example of wind speed variation as would be monitored for an example wind farm.

Wind power has the highest variability in Region-II. To understand this, an example of the probability distribution of wind speed is shown in FIG. 24. The variations in wind speed are typically described by the Weibull distribution:

$$f(v) = \left(\frac{k}{c}\right)\left(\frac{v}{c}\right)^{k-1} e^{-(v/c)^k}, v \ni (0, \infty) \qquad (1)$$

In equation (1), k is the shape parameter, c is the scale parameter and v is the wind speed. At most wind farm sites, the wind speed has the Weibull distribution with k=2, which is specifically known as the Rayleigh distribution. As shown in FIG. 24, the Rayleigh distribution function in Region-II is not a monotone function. In this region, the wind speed has equally high possibilities at a wide range of values. As a result, the wind turbine is more likely to incur time-varying wind speed in Region-II. In addition, the wind turbine output is a steep curve due to the cubic relation between wind power and wind speed. In this case, a small change of the wind speed may lead to large wind generation fluctuation. Therefore, the renewable power variability is typically significant in Region-II.

Figure 25:
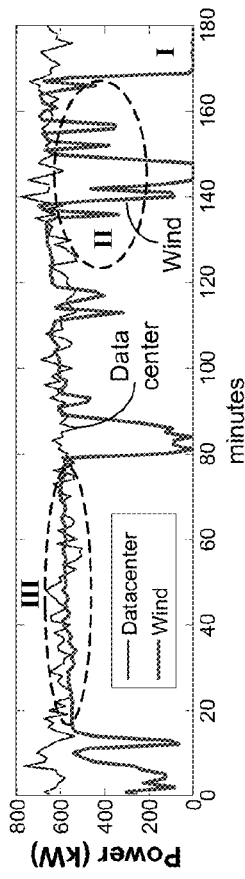
FIG. 25 is a schematic diagram that illustrates an exemplary power variation scenario in a wind energy driven data center.

FIG. 25 shows an example of real traces of wind power supply and data center power demand. The characterization on wind power variation shows that the data center experiences three renewable power supply scenarios, namely, intermittent wind power outage period (Region-I), low renewable generation with frequent fluctuation (Region-II), and full renewable generation with relatively stable output (Region-Ill). In the following paragraphs, certain design considerations for each region are described.

During the low generation period (i.e., Region-I), it is wise to shift data center load from the renewable energy supply side to utility power. To tune the load power footprint, servers may be put into low power states or power cycling techniques may be applied on the hardware. Although these approaches provide power control capability, they may sacrifice the computing throughput. In addition, it typically takes a long time (e.g., about tens of minutes) for the renewable energy generation to resume. As a result, for mission-critical systems, putting servers into sleep state and waiting for the renewable energy to resume is not wise, especially for those parallel computing machines with inter-node workload dependency.

As to Region II, whenever the load power fluctuates or renewable energy generation varies, load matching is performed as a common practice to handle the power discrepancy. In Region-II, the wind generation can oscillate severely. The load power tuning is largely a result of the power supply variation, as shown in FIG. 25. However, aggressively matching the load to the supply results in little energy benefits but instead disturbs the normal server operation and may degrade the performance of parallel workload. Therefore, appropriate tracking timing is desirable.

Referring to Region III, when the renewable energy is relatively stable, frequent load fluctuations contribute to a number of load tuning operations. In FIG. 25 (Region III), although the data center power has a relatively small dynamic range, frequent variation invokes a large number of back-and-forth load migration operations. Those tuning activities have little contribution to the overall renewable energy utilization but increase network traffic significantly. A well designed job scheduling that mitigates load power fluctuation may help lower the overhead.

A renewable energy powered data center may frequently experience the aforementioned three power management regions throughout its lifetime. To improve overall quality of service, the best design practice should put the above scenarios together and provide a cooperative power management scheme.

Figure 26:
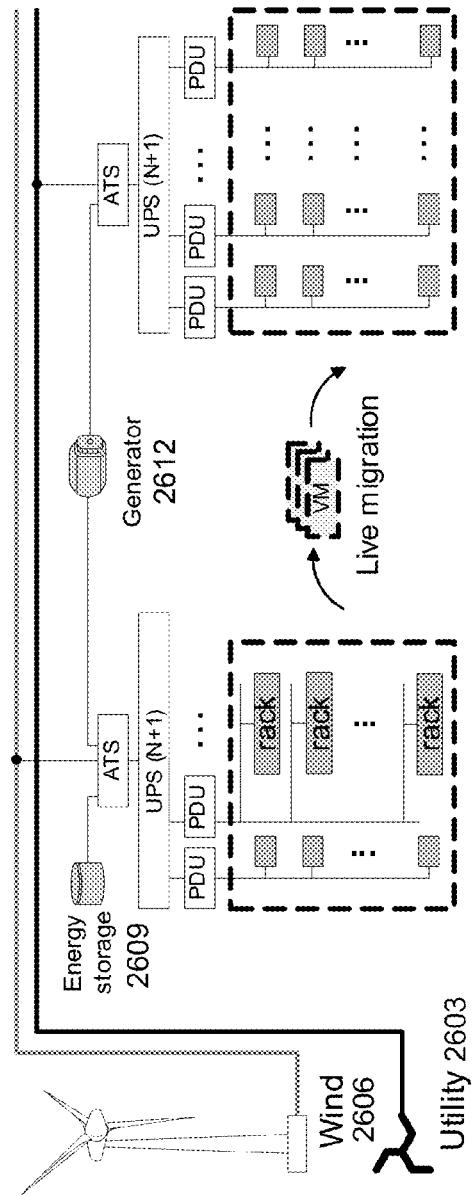
FIG. 26 is a schematic diagram that illustrates another example of a renewable energy control system.

Certain embodiments of iSwitch provide a holistic data center coordination and optimization scheme that ensures high renewable energy utilization and low operational overhead. FIG. 26 illustrates an example of iSwitch load power balancing in wind energy powered server clusters. As shown in FIG. 26, iSwitch can provide autonomic load power balancing control between a conventional utility grid 2603 and renewable energy generation such as, e.g., a wind generator 2606. The basic idea behind iSwitch is switching or the operation of performing a switch, which refers to a load migration activity that leads to redistribution of load demand between different power supplies. As an alternative to load power throttling, iSwitch intelligently shifts the computing load from one energy source to another to achieve best load power matching. A virtual machine (VM) is used in live migration to implement iSwitch since it is the most convenient way to perform load power shifting in a virtualized computing environment. Virtual machine power metering also eases the monitoring and coordination of each individual VM.

Note that in FIG. 26, iSwitch does not require increasing the number of servers to meet the workload surge. A cluster of server racks may spend more than 80% of the time within 80% of its peak power, and 98% of the time within 90% of its peak power. Therefore, the chance of workload triggered peak power surge is small. In this disclosure, it is assumed that the number of renewable energy powered servers is less than 40% of the overall deployed machines since a data center typically consumes more than 60% of its actual peak power. In this case, even if the wind power is extremely low, the utility grid can still take over most of the load. However, by increasing the installed on-site renewable energy capacity and using hybrid renewable energy sources (e.g., wind and/or solar), one may further increase the portion of renewable energy powered servers. In emergency scenarios, a generator 2609 and/or backup energy storage 2612 may be used to temporarily support the load.

To handle the time-varying, intermittent renewable power, iSwitch dynamically allocates and de-allocates (i.e., "switches") the renewable energy powered load. The supply/load variability makes the switch tuning challenging since the control should globally respect the time-varying renewable budget and locally avoid any power failure induced by load fluctuation. To this end, certain embodiments of iSwitch use a hierarchical control scheme, which may be easily incorporated into existing hierarchical power management methods.

FIG. 27 shows an example of an iSwitch control mechanism at a global (facility) level. The switching operation is controlled by a central switch controller (CSC) 2703, which communicates with a central power controller 2706 (a typical facility-level data center power controller), a switch scheduler 2709 and multiple cluster level switch controllers 2712. CSC 2703 performs switch tuning based on the discrepancy between the load power consumption and the RES budget. Whenever needed, switching operations are scheduled by the switch scheduler 2709, which stores profiling information for each server load and optimizes switching using load history records 2715, as described further below.

The switching allocation is assigned to local computing nodes via cluster-level switching controllers 2712, which are counterparts to PDU-level power controllers 2718. The cluster-level switching controller 2712 collects switching outcomes (e.g., the number of switching operations accomplished/failed) of each local computing node and feeds the information to the CSC 2703 for switching scheduler updates. The cluster-level controller 2712 improves the manageability of dynamic switching and reduces the overhead of CSC communication traffic. A cluster-level utilization monitor 2721 interfaces with the central power controller 2706 to monitor the server load of the server racks 2724 and update the load history records 2715. In some embodiments, the CSC 2703, switch scheduler 2709, load history records 2715, and/or cluster-level utilization monitor 2721 may be implemented in a common controller unit.

FIG. 28 illustrates an example of the iSwitch local (rack level) control. As shown in FIG. 28, a rack-level switch controller 2803 executes the power supply switching and sends the execution outcomes to the CSC 2703 via a cluster-level switch controller 2712 (FIG. 27). It also interacts with the rack power controller 2806 throughout the switching allocation to avoid any brownout. For example, whenever the rack power consumption reaches the local renewable power budget, the power controller 2806 may signal the switch controller 2803 to throttle the switching assignment. In addition, the rack power controller 2806 is able to perform power capping by manipulating the voltage and frequency (V/F) modulator of the servers 2809, which may prevent over-loading if power switching cannot handle the load surge in time.

The section that follows describes an example supply/load cooperative optimization scheme of certain embodiments of iSwitch. One technique that may be employed features a lazy tracking scheme on the supply side and a power demand smoothing scheme on the load side. This cooperative optimization is readily supported by data center architectures and is orthogonal to other system-level control and workload optimizations.

The switching scheduler 2709 is an important architecture component for iSwitch optimization, as shown in FIG. 29. It monitors the power provisioning status (i.e., powered by renewable energy or powered by utility) of each server load (or VM). All the running loads within each cluster are indexed consecutively in a switching allocation buffer (SAB) 2903. The SAB 2903 indicates whether a server of a cluster (e.g., C-I to C-V) is utility driven (U), RES driven (R), or shutdown (S). In the iSwitch scheduler 2709, an optimizer 2906 is used to compute the optimal switch assignment and a switching history table 2909 is used to store the switch frequency for each load.

To make load tuning decisions, the iSwitch scheduler 2709 needs profiling information such as average utilization from the load history table (or records) 2715. The scheduling is invoked by the central controller 2703 in response to a significant change of the renewable power supply or the load power consumption. One or more predefined thresholds may be used to determine when a change is significant. Whenever necessary, the iSwitch scheduler 2709 sends a sequence of load switching commands to the central controller 2703 for execution.

Certain embodiments of iSwitch avoid tracking the severely fluctuating renewable power in Region-II. Inside the iSwitch scheduler, a tracking module 2912 manages iSwitch power tracking, as shown in FIG. 29, referred to herein also as lazy tracking because the module only harvests the relatively stable renewable energy generation. Note that iSwitch carefully distributes the switching activities across all the loads evenly to avoid local traffic jam.

At each fine-grained interval, when switching is triggered by the CSC 2703, an estimated switching assignment is sent to the iSwitch scheduler 2709 for calculating the switch operation balance (e.g., estimated assignment minus the baseline). If the switch balance indicates a reduced number of servers to RES connection, the iSwitch scheduler 2709 signals the CSC 2703 to schedule the estimated assignment to avoid brownout. On the other hand, if the switching balance suggests an increased number of servers to RES connection (e.g., due to temporally decreased load or increased supply), the iSwitch scheduler signals CSC 2703 only if the balance is below a preset threshold (e.g., 10% of the baseline). In this case, the high-frequency switching surge is ignored, the surge bringing little benefit on renewable energy utilization but leading to excessive unnecessary tuning.

Figure 30:
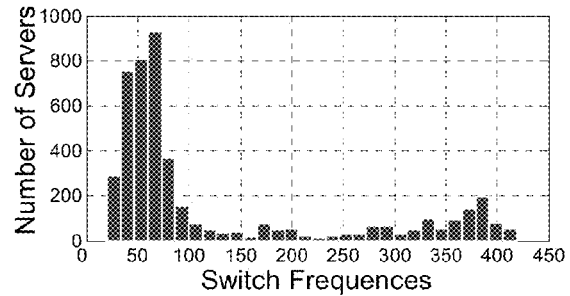
FIG. 30 is a schematic diagram that illustrates an example of a histogram of switching frequencies based on a round-robin technique.

Within each cluster, iSwitch (in one or more embodiments) allocates switch operations with a least recently used (LRU) scheme, which avoids aggressively tuning a small set of computing nodes. Note that a naive switching allocation can result in unbalanced switching allocation. FIG. 30 illustrates an example of a histogram of switching frequency (or switching distribution) as a result of using a round-robin allocation. The histogram of a LRU is typically a single bin. The average switching frequency is 200 times per day per server. A small group of servers receives very heavy tuning stress (e.g., up to 400 times per day). As a result, some server racks may incur more performance penalty due to high communication traffic.

To implement LRU, iSwitch uses the switch frequency record stored in the switching history table 2909. The operation of iSwitch scheduler relies on the load history record 2715 of the previous control period. This record may be implemented using a round-robin database (circular buffer) with constant storage occupation over the time. Such a round-robin database is easy to reconfigure and manage in most Linux servers with RRDtool, which is an industry standard, high performance data logging system.

Optimizing the supply-side fluctuation alone may not achieve significant overhead mitigation. To this end, certain embodiments of iSwitch leverage the heterogeneity of server clusters to minimize load fluctuation induced overhead in power management region III.

Figure 31:
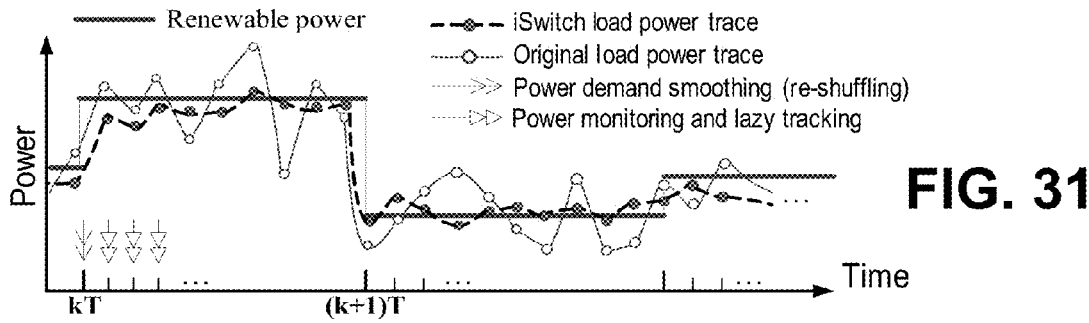
FIG. 31 is a schematic diagram that illustrates an example of an optimization timeline of a renewable energy control system.

FIG. 31 illustrates an example of a switch management optimization timeline of iSwitch. The controller re-shuffles the renewable energy powered servers (demand smoothing) at a coarse-grained time interval R (e.g., 15 minutes as the default value in some experiments). During each re-shuffling interval, the average load utilization (lazy tracking) is recorded in a fine-grained time interval (e.g., 1 min) and is used to predict the load for the next period. Upon rescheduling, the optimizer 2906 in the iSwitch scheduler updates the baseline switch operations of each server cluster in SAB 2903 with the goal of mitigating the likelihood of severe load power fluctuation in the next control period. Each switch tuning invoked by CSC 2703 will be assigned based on the updated SAB 2903.

At the beginning of each control period, iSwitch recalculates the optimal switch assignment. Suppose the data center servers are logically divided into C clusters and the loading is homogeneous within any given cluster. The re-shuffling control period is set as R=m·t, where t is the load utilization monitoring interval. Let $u_i = [u_{11}\ u_{12}\ \ldots\ u_{1c}]$ denote the average utilization of each cluster at time stamp i. The utilization history record for the previous period that consists of m time stamps is given by:

$$U = \begin{bmatrix} u_{11} & u_{12} & \ldots & u_{1c} \\ u_{21} & u_{22} & \ldots & u_{2c} \\ \vdots & \vdots & \ddots & \vdots \\ u_{m1} & u_{m2} & \ldots & u_{mc} \end{bmatrix} \quad (2)$$

Assuming that a total number of N virtual machines are to be connected to the renewable power supply in the next control period, then N can be calculated as $N = P_{RES}/\bar{P}$, where $P_{RES}$ is the renewable power budget at the end of the previous control period and $\bar{P}$ is the average power consumption of the previous control period. The switching assignment for the next control period may be expressed as $S = [s_1\ s_2\ \ldots\ s_c]$, where $s_k$ is the number of VMs selected to be tuned for cluster k. To reduce unnecessary power switching, one goal is for the aggregate server power consumption to have small oscillations in the following control period, namely, the standard deviation of the aggregate utilization should be minimized. The aggregate utilization is given by $[a_{ij}]_{m \times 1} = U \times S^T$. The standard deviation of the expected utilization in next control period can be calculated as:

$$\sigma = \sqrt{\frac{1}{m}\sum_{i=1}^{m}(a_i - \mu)^2} = \sqrt{\frac{1}{m}\sum_{i=1}^{m}a_i^2 - \left(\frac{1}{m}\sum_{i=1}^{m}a_i\right)^2} \quad (3)$$

and $$a_i = \sum_{k=1}^{c} u_{ik} s_k$$

In Equation (3), $a_i$ is the aggregate utilization of renewable energy powered load and $\mu$ is the mean utilization in the past control period. The re-shuffling problem can therefore be formulated as:

$$\text{Objective: } \min\left\{\frac{1}{m}\sum_{i=1}^{m}a_i^2 - \left(\frac{1}{m}\sum_{i=1}^{m}a_i\right)^2\right\} \quad (4)$$

$$\text{Constraints: } \sum_{k=1}^{c} s_k \leq N \quad (5)$$

The above non-linear minimization problem is solved with simulated annealing (SA). Given the utilization history records, an SA solver is capable of finding the desired global extreme very fast. Note that the renewable power supply fluctuation typically occurs on a coarse-grained time interval (several minutes). As a result, the execution time of SA solver (which may take up to several seconds) does not affect the optimization effectiveness. At the beginning of the re-shuffling period, the switching operations are assigned in proportion to the number of servers in the cluster. During the computation, the SA solver iteratively generates a stochastic perturbation for the switching assignment and checks whether or not the optimum solution is reached.

The iSwitch design was evaluated with trace-driven simulation. A framework was developed that simulates dynamic load tuning and hierarchical power control in renewable energy powered data centers. For each of the scheduled job requests, a calculation of its contribution to the overall data center power consumption based on the number of nodes requested and the job's specific resource utilization statistics. The employed framework takes realistic wind energy generation traces as supply-side input.

A raised floor data center consisting of 4,800 servers was assumed where the servers are organized as twelve rows with each row powered by a 100 KW PDU. There are ten 40 U server racks in each row and the server modeled resembles an HP ProLiant DL 360 G6. The peak and idle power of the modeled server are 186 W and 62 W respectively. The server utilization traces are converted to its power consumption using the published SPECPower results, which have been widely used for data center power evaluation. Since the SPECPower results only reflect the server power at intervals of 10% utilization, linear interpolation is used to approximate the power across different load levels.

Data centers were evaluated with both homogeneous and heterogeneous load variations. The homogeneous workload configuration assumes that all the servers are running the same workload and have similar utilization levels. As shown in TABLE 8, the homogeneous utilization traces were generated from the raw data provided by the Internet Traffic Archive. The request rate (requests per minute) was converted into server utilization by investigating the maximum request rate (corresponding to 100% loading) and minimum request rate (corresponding to 0% loading). The server utilization traces generated represent a one-week server load variation including idle period, peak hours and daily surge.

The heterogeneous data center configuration is based on an academic high-performance computing (HPC) center, which hosts more than 600 servers. The HPC center has five major clusters (C-I to C-V) with different service targets and loads, as detailed in TABLE 9. Those clusters have 20 to 400 computing nodes and their average utilization ranges from 25% to more than 90%. All the clusters are managed with RRDtool, which enables autonomic data logging and trace generation. Since there is limited access to industrial data center traces, real-world workload logs were collected from a well-established online repository. The workload logs provide information such as job arrival times, start time, completion time, size in number of computing nodes, etc. The "cleaned" version of each trace log was chosen. These traces have been already scrubbed to remove workload flurries and other anomalous data that could skew the performance evaluation.

TABLE 8

Traces of homogeneous server utilization.

| Trace | Description | Avg. loading | Load level |
| --- | --- | --- | --- |
| Calgary | University Web | 2.8% | Very low |
| U of S | University Web | 7.5% | Low |
| NASA | Kennedy Space | 27.8% | Moderate |
| Clark | Clark WWW | 33.4% | High |
| UCB | UC Berkeley IP | 43.2% | Busy |

TABLE 9

Configuration of heterogeneous clusters.

| | Cluster ID | % of overall deployed | Avg. loading |
| --- | --- | --- | --- |
| HPC | C-I | 5% | 97% |
| | C-II | 63% | 60% |
| | C-III | 17% | 57% |
| | C-IV | 3% | 54% |
| | C-V | 12% | 25% |

TABLE 10 summarizes the evaluated workload trace combinations. Various workload mixes were constructed to mimic today's data centers that are composed of many small co-located clusters. Each workload set in TABLE 10 consists of five workload traces which run on the aforementioned five clusters (C-I to C-V) respectively. To form representative workload sets, workload traces were characterized based on their average job size and runtime. In TABLE 10, Mix-High includes traces that have larger job size (resulting in >30% average data center utilization) and Mix-Low contains traces that have small job size (resulting in <10% utilization). On the other hand, Mix-Stable consists of five traces that feature relatively longer job runtime and Mix-Bursty consists of traces that have very short job runtime.

TABLE 10

The evaluated heterogeneous datacenter workload sets. Each workload sets consists of five parallel workload traces which are feed to clusters C-I to C-V showing in TABLE 9.

| Workload set | Description | Workload trace combination |
| --- | --- | --- |
| Mix-High | High utilization | "HPC2N" + "LANL CM5" + "LPC EGEE" + "SDSC BLUE" + "LLNL Thunder" |
| Mix-Low | Low utilization | "DAS- fs0" + "DAS2-fs1" + "DAS2-fs2" + "DAS2-fs3" + "DAS2-fs4" |
| Mix-Stable | Stable power demand | "HPC2N" + "KTH SP2" + "LANL CM5" + "DAS2-fs0" + "SDSC BLUE" |
| Mix-Bursty | Bursty power demand | "DAS2-fs2" + "DAS2-fs3" + "DAS2-fs4" + "LPC EGEE" + "OSC Cluster" |
| Mix-Rand | Random combination | "LLNL Thunder" + "OSC Cluster" + "LPC EGEE" + "LANL CM5" + "KTH SP2" |
| Dept-HPC | | Traces collected from departmental high-performance computing center |

Wind power data traces from the wind integration datasets of the National Renewable Energy Laboratory were used. These wind generation datasets are time-series data of wind power output derived from commercially prevalent wind turbines characteristics and the manufacturer's rated wind power curve. Two groups of traces across different geographic locations were selected and their characteristics are listed in TABLE 11.

In TABLE 11, capacity factor (CF) is the ratio of the actual wind turbine output to the theoretical peak generations. Since there is an interest in the wind energy variation and intermittency, a group of traces with various CF values (e.g., Group-I) were selected. While a typical capacity factor of wind turbine is 30%, higher capacity factor usually represents better wind energy potential, small power variation and less generation stoppage. The total installed wind power capacity in this evaluation equals to the peak power demand of the studied data center (e.g., 4800×186 W=892.8 KW). The actual wind power budget is therefore only affected by the capacity factor. Note that power supply traces of two extreme scenarios (e.g., Group-II) were evaluated: one has very smooth and stable generation and another has high output fluctuation rate. All the other renewable supply traces can be seen as a combination of the two basic traces plus the intermittently unavailable periods.

TABLE 11

The evaluated wind power supply traces. Group-I highlights different wind power generation potentials. Group-II focuses on variation intensity of the supply and is used for characterization purpose.

| | Trace abbr. | Wind energy potential | Locations (station ID) | CF | Power density |
| --- | --- | --- | --- | --- | --- |
| I | W1 | Low | California (9250) | 15% | 195 W/m$^2$ |
| | W2 | Medium | Arizona (6107) | 25% | 338 W/m$^2$ |
| | W3 | Typical | Colorado (10563) | 35% | 581 W/m$^2$ |
| | W4 | High | Texas (1360) | 45% | 708 W/m$^2$ |
| II | LVS | Low variation trace | Wyoming (15895) | 50% | 1021 W/m$^2$ |
| | HVS | High variation trace | Utah (11967) | 21% | 607 W/m$^2$ |

This section quantifies the performance and efficiency of iSwitch on a wide range of workload configurations. The impact of supply/load power variability on data center load matching is characterized using homogeneous workload traces. The performance overhead and energy utilization of iSwitch is compared to some state-of-the-art approaches. In TABLE 12, Utility and Battery are two conventional schemes which do not involve supply-driven load matching. A Green design is the most sustainable design. Tracking represents emerging design approaches which leverage load adaptation to actively track every joule of renewable energy generation.

Figure 32:
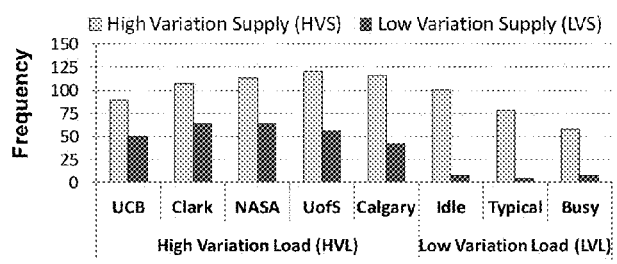
FIG. 32 is a schematic diagram that illustrates an example of average switching frequency.
Figure 33:
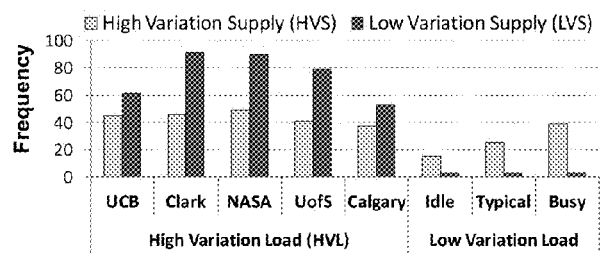
FIG. 33 is a schematic diagram that illustrates an example of standard deviation of a switching operation.

To understand how power variation affects the load matching behavior, the load migration frequency of each server across different load levels and renewable power supply scenarios was monitored. FIG. 32 shows the average switching frequency over all the servers and FIG. 33 characterizes the standard deviation of the migration activities of a single server. In FIGS. 32-33, "Idle", "Typical" and "Busy" are data center traces that have average utilization levels of 0%, 30% and 60%, respectively. These three synthetic data center traces were generated to mimic low load variation data centers.

TABLE 12

The evaluated power management schemes.

| Abbr. | Design philosophy | Supply tracking? | Stored energy? | Load deferment? |
|---|---|---|---|---|
| Utility | Fully rely on utility grid | No | No | No |
| Battery | Rely on battery to provide reliable renewable power | No | Yes | No |
| Green | Focus on sustainability, 100% renewable energy powered | Yes | No | Yes |
| Tracking | Maximizing efficiency/ performance with aggressive tracking | Yes | Yes | No |
| iSwitch | High sustainability + low overhead + low latency | Yes | Yes | No |

When the supply variation is high (HVS), heavy switch tuning across a large group of data center servers is common. Therefore, the average switch frequency is high and the standard deviation is not very large. For low supply variation (LVS), however, the standard deviation increases by 66% since the switching triggered by load oscillations typically stresses a relatively small group of server loads.

Since the load variation is less severe, the total switching activities are reduced in both cases (HVS or LVS) and the average switching frequency is small. For example, the "Typical" variation has similar average loading compared to the "NASA" variation. However, the former reduces average switching frequency by 31% when the supply variation is high (HVS) and by 90% when the supply variation is low (LVS). In FIGS. 32 and 33, a combination of HVS and LVS manifests the lowest control effort since the mean value and standard deviation of per server load migration are both very small.

To summarize, choosing a subset of server load that has lower total power variation can significantly reduce the load switching demand, especially when the supply variation is low. When the supply variation is high, simply dampening the load power variation has limited impact and in this case switch capping can be used to avoid unnecessary tuning activities. In the sections below, shown is how much operational overhead can be reduced with iSwitch supply/load cooperative optimization.

Frequent load matching activities result in operational overhead, which is of primary concern in the design of renewable energy powered computing systems. In a virtualized environment, iSwitch may effectively reduce the VM migration rate and help to save data center network bandwidth significantly. The data migration traffic is calculated at rack-level. Each VM live migration transfers approximately the size of the VM's memory between hosts. It is assumed a VM memory size of 1.7 GB in the calculation, which is the default memory size of Amazon EC2 standard instance.

Figure 34:
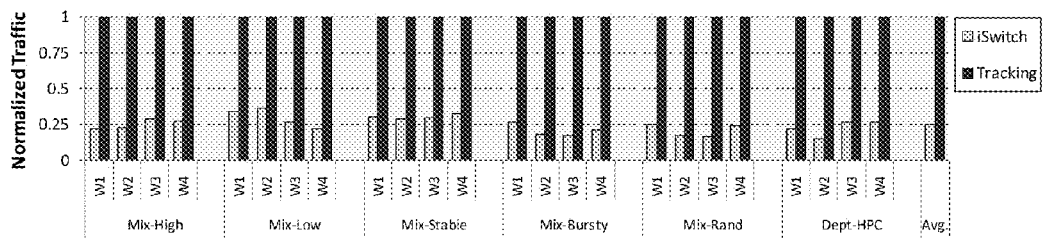
FIG. 34 is a schematic diagram that illustrates examples of the average communication traffic across various workload configurations and wind power supply levels.
Figure 35:
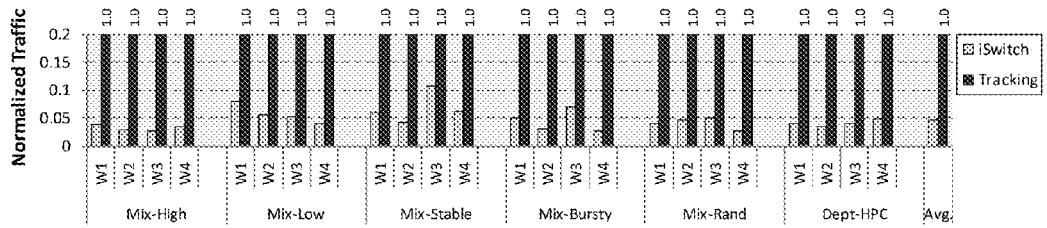
FIG. 35 is a schematic diagram that illustrates examples of peak-network traffic across various workload configurations and wind power supply levels.

FIG. 34 shows the average communication network traffic across various workload configurations and wind power supply levels. All the results are normalized to Tracking. Not shown are the results of the Green design because it has the same power tracking frequency as the Tracking design. As can be seen, on average, iSwitch may reduce 75% of the rack-level traffic and therefore significantly releases the network bandwidth burden. The results are even more impressive for peak traffic hours when the renewable energy fluctuates severely. In FIG. 35, the peak communication network traffic of the top 1% high-traffic hours is calculated. Because iSwitch puts a limit on the power tracking activities during fluctuant supply period, it shows only 5% network traffic compared with Tracking.

Another advantage of certain embodiments of iSwitch is that it reduces the migration frequency of each VM instance and thereby improves the job turnaround time. Due to the intermittency of renewable generation, stand-alone systems such as the Green design may experience long waiting time (about tens of minutes as observed in experiments). These systems typically leverage deferrable load to meet the power budget or simply perform load shedding to avoid brownout. Even for utility-connected systems such as iSwitch and Tracking, latency exists due to the data migration time. For example, the time needed for a 1G VM migration takes about 20 seconds to complete.

Figure 36:
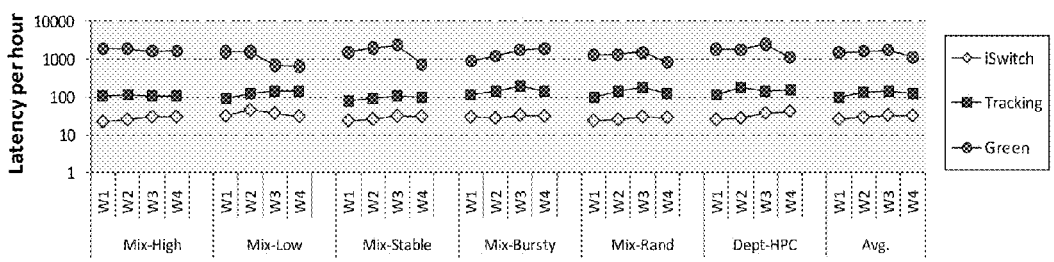
FIG. 36 is a schematic diagram that illustrates examples of average latency for job requests across various workload configurations and wind power supply levels.

In the present disclosure, a latency per hour (LPH) is used to evaluate the performance overhead. For example, a LPH of 10 means each individual VM instance experiences 10 seconds waiting time per hour on average. FIG. 36 shows the average LPH (of job requests) across the entire data center servers. The average LPH of iSwitch is about 30 seconds per hour while the average LPH of Tracking reaches 126 seconds per hour. The average LPH of the Green design, however, is about 1500 seconds per hour—50 times that of iSwitch. Therefore, waiting for renewable energy to resume (the approach of the Green design) should be the last resort.

The renewable energy utilization (REU) of data centers is evaluated with different wind power provisioning capacities and workload behaviors. The REU is defined as the amount of wind energy that is actually utilized by the load divided by the total amount of wind energy generation. A higher REU indicates better supply/demand coordination, which reduces on-site energy storage capacity, improves the return-on-investment (ROI), improves data center sustainability and eases the initial infrastructure planning.

Figure 37:
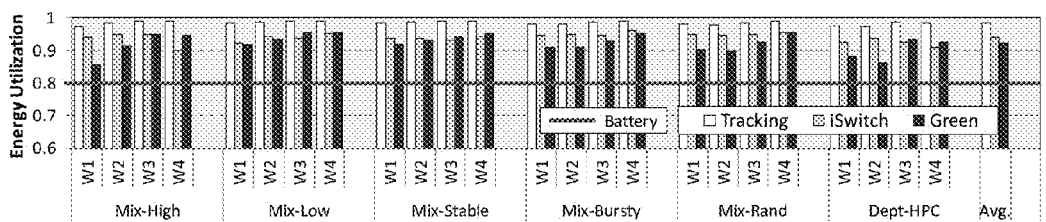
FIG. 37 is a schematic diagram that illustrates examples of normalized overall wind energy utilization across various workload configurations and wind power supply levels.

While certain embodiments of iSwitch use a lazy power tracking scheme, it does not sacrifice energy utilization significantly. FIG. 37 illustrates the normalized overall wind energy utilization. As shown in FIG. 37, iSwitch may achieve an average renewable energy utilization of 94%—higher than Green (92%) but lower than Tracking (98%). The reason why Tracking outperforms iSwitch on energy utilization is that Tracking tracks every joule of wind energy aggressively. Note that a 4% decrease in energy utilization does not mean that iSwitch is less preferable; iSwitch significantly reduces the network traffic and improves the performance by 4x. In contrast to Tracking, iSwitch trades off energy utilization for better job turnaround time.

Improperly setting the iSwitch re-shuffling intervals leads to degraded optimization effectiveness. To understand the tradeoff, the design space is characterized by varying the load re-shuffling intervals. In the following discussions, "S-x" means iSwitch with a re-shuffling interval of x minutes.

The length of iSwitch re-shuffling interval affects iSwitch load matching in two ways. First, short re-shuffling intervals limit the load fluctuation mitigation because a short load history record gives less accurate prediction. Second, a shorter time interval means more frequent re-shuffling and therefore magnified control overhead. This control overhead arises because the SA solver in iSwitch may request additional switch tuning to mitigate the total variation. For example, instead of directly switching 100 servers from utility to RES, the scheduler may first disconnect 20 high-variation wind-powered loads and then connect 120 low-variation loads to the wind turbine.

Figure 38A:
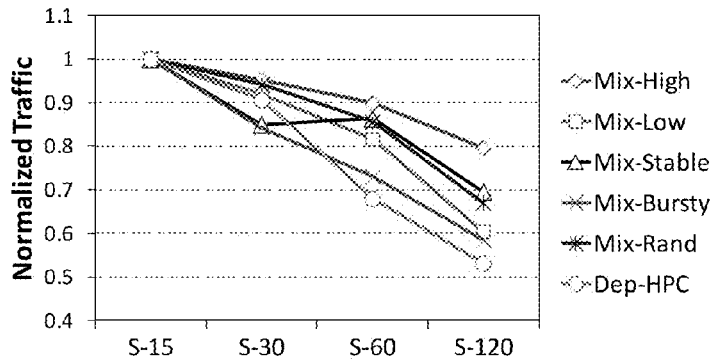
FIGS. 38A and 38B are schematic diagrams that illustrate examples of normalized network traffic and energy utilization for an embodiment of a renewable energy control system.
Figure 38B:
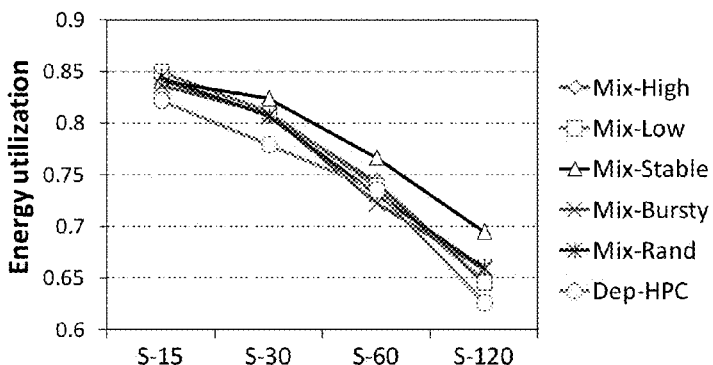
Figure 39:
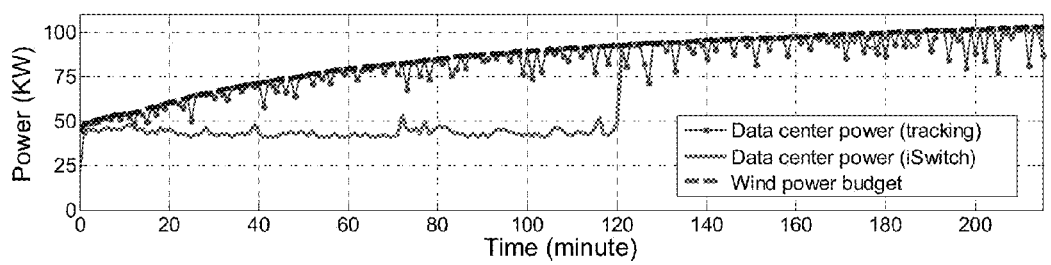
FIG. 39 is a schematic diagram that illustrates an example of the impact of a long term re-shuffling interval for an embodiment of a renewable energy control system.

The average network traffic under various re-shuffling intervals was analyzed. FIGS. 38A and 38B illustrate examples of the normalized network traffic and energy utilization (respectively) of iSwitch with different control intervals. The results include all six workload trace sets. The wind energy trace used was W3, which has typical wind energy potential. In FIG. 38A, all the results are normalized to S-15. It shows that increasing the re-shuffling interval may mitigate the overhead and reduce network traffic. For example, S-120 manifests 35% traffic reduction compared with S-15. However, an extended re-shuffling interval may also degrade iSwitch energy utilization due to the decreased adaptivity. The impact of long re-shuffling periods on direct renewable energy utilization (DREU) was evaluated, as shown in FIG. 38B. Here, direct renewable energy utilization means the renewable energy directly utilized by the system without passing through batteries. Compared to S-15, S-120 yields about 24% DREU degradation (which means increased battery capacity is required to store the remaining generation). To understand the DREU degradation, a fraction of data center power consumption trace controlled by S-120 is shown, which uses a two-hour load history record as prediction input. In FIG. 39 iSwitch does not react to the gradual renewable power supply increase.

For a better tradeoff between energy utilization and switching optimization, a control period of 15~30 minutes is recommended. In this case, iSwitch may reduce 75% average load tuning demand while still maintaining more than 80% direct wind energy utilization (94% overall wind energy utilization if combined with a battery).

Because iSwitch is capable of utilizing the renewable power directly, a large amount of battery capacities is saved. Otherwise, a large-scale battery is needed to store the unused excess generation, which is not economic and environment-friendly.

Figure 40:
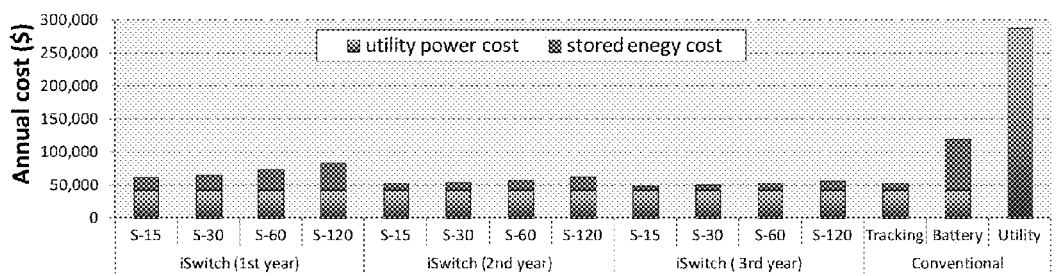
FIG. 40 is a schematic diagram that illustrates an example of annual operating costs for different design scenarios.

In FIG. 40, shown is a projected annual operating cost of designing a wind energy-powered small-scale data center (e.g., a 890 KW server deployment). The average retail price of electricity in industrial sector is about 0.07$/KW. The estimated energy storage cost is 300$/KW for lead-acid batteries. A lower direct renewable energy utilization rate leads to increased battery capacity demand. In FIG. 40, the operating cost of S-120 in the first year is 35% of a utility powered data center (Utility). After three years, the average annual operating cost is only 20% of Utility. The implementation cost is amortized by the renewable energy in the following deployment duration.

Substantial research has been done on optimizing power efficiency of data centers. Although such works may be leveraged to track the time-varying renewable power supply, none of them are aware of the supply variation attributes. As a result, they incur significant power management overhead but gain very limited energy efficiency return.

Intermittency is the most significant challenge in a renewable energy powered computing system. In contrast to existing work, certain embodiments of iSwitch underscore the benefits of putting utility power, energy storage and hierarchical load migration coordination together, hence providing a supply-aware, lightweight, supply/load cooperative optimization that significantly reduces existing renewable power management overhead while still maintaining very high energy utilization.

Environmental and energy price concerns have become key drivers in the market for sustainable computing. The advance of renewable energy technologies and continuously decreasing renewable power cost have made renewable energy driven data centers a proven alternative to conventional utility-dependent data centers and the market is rapidly growing.

Matching the variable load power consumption to the intermittent power supply appropriately is important to designing a renewable energy powered data center. Conventional workload-driven power management has less adaptability to the power supply variation while existing power-driven system control schemes are not aware that they are experiencing unnecessary and redundant tuning activities. As a result, the opportunity of utilizing precious renewable energy is missed or significant load tuning overhead and performance degradation are incurred.

Certain embodiments of iSwitch provide a renewable energy-driven power tuning scheme that addresses a two-fold challenge: the first is to manage intermittent renewable power without sacrificing performance due to power throttling; the second is to ensure high energy utilization with minimized load matching activities, hence providing insight into renewable power variation characteristics and introducing a supply/load cooperative optimization scheme that minimizes power management overhead. Compared to existing designs, certain embodiments of iSwitch may reduce job waiting time by 80%, mitigate average network traffic by 75%, and rush hour traffic by 95%. Moreover, 96% of the energy efficiency may be maintained and requires only minor cost increase. Certain embodiments of iSwitch enable the handling of intermittent renewable power in a lightweight, easy-to-implement, and more efficient manner, facilitating data center designers in taking a big step forward in the green computing era.

Figure 41:
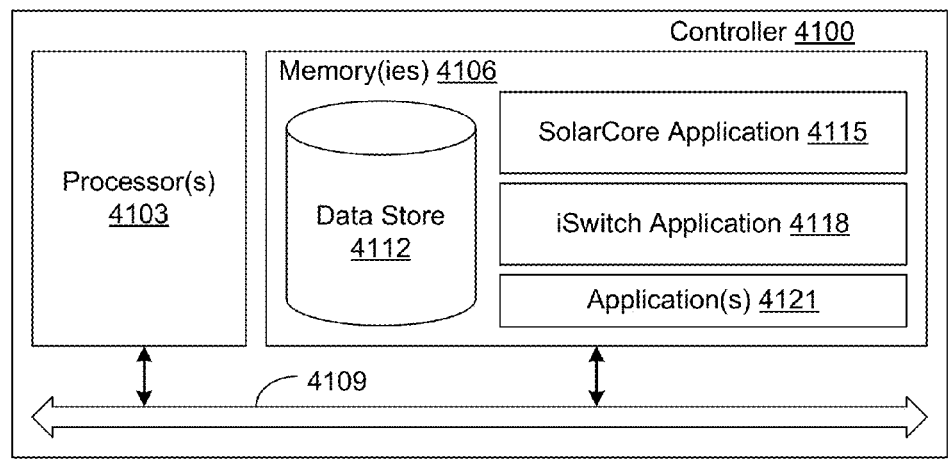
FIG. 41 is a schematic block diagram of a controller in accordance with various embodiments of the present disclosure.

With reference to FIG. 41, shown is a schematic block diagram of a controller 4100 according to various embodiments of the present disclosure. The controller 4100 includes at least one processor circuit, for example, having a processor 4103 and a memory 4106, both of which are coupled to a local interface 4109. To this end, the controller 4100 may comprise, for example, at least one computer or like device. The local interface 4109 may comprise, for example, a data bus with an accompanying address/control bus or other bus structure as can be appreciated.

Stored in the memory 4106 are both data and several components that are executable by the processor 4103. In particular, stored in the memory 4106 and executable by the processor 4103 may be a SolarCore application 4115, an iSwitch application 4118, and/or other applications 4121. Also stored in the memory 4106 may be a data store 4112 and other data. In addition, an operating system may be stored in the memory 4106 and executable by the processor 4103.

It is understood that there may be other applications that are stored in the memory 4106 and are executable by the processor 4103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 4106 and are executable by the processor 4103. In this respect, the term "executable" means a program file that is in a form that can ultimately be run by the processor 4103. Examples of executable programs may be, for example, a compiled program that can be translated into machine code in a format that can be loaded into a random access portion of the memory 4106 and run by the processor 4103, source code that may be expressed in proper format such as object code that is capable of being loaded into a random access portion of the memory 4106 and executed by the processor 4103, or source code that may be interpreted by another executable program to generate instructions in a random access portion of the memory 4106 to be executed by the processor 4103, etc. An executable program may be stored in any portion or component of the memory 4106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 4106 is defined herein as including both volatile and nonvolatile memory and data storage components. Volatile components are those that do not retain data values upon loss of power. Nonvolatile components are those that retain data upon a loss of power. Thus, the memory 4106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 4103 may represent multiple processors 4103 and the memory 4106 may represent multiple memories 4106 that operate in parallel processing circuits, respectively. In such a case, the local interface 4109 may be an appropriate network that facilitates communication between any two of the multiple processors 4103, between any processor 4103 and any of the memories 4106, or between any two of the memories 4106, etc. The local interface 4109 may comprise additional systems designed to coordinate this communication, including, for example, performing load balancing. The processor 4103 may be of electrical or of some other available construction.

Although the SolarCore application 4115, iSwitch application 4118, application(s) 4121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the SolarCore application 4115, an iSwitch application 4118, and/or application(s) 4121, that comprises software or code can be embodied in any non-transitory computer-readable medium for use by or in connection with an instruction execution system such as, for example, a processor 4103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and subrange is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

At least the following is claimed:

1. A system, comprising:
   at least one cluster including a plurality of servers; and
   a power manager configured to switch at least a portion of the plurality of servers between a renewable energy supply (RES) and a utility energy supply based at least in part upon a budget level corresponding to an amount of power available from the RES and a load power consumption of the at least one cluster, where the power manager comprises a central switch controller configured to switch the at least a portion of the plurality of servers based upon a switch assignment determined by a switch scheduler based at least in part upon switching history and load history.

2. The system of claim 1, wherein switching the at least a portion of the plurality of servers comprises virtual machine migration to move workload between servers.

3. The system of claim 1, wherein switch assignment indicates that each of the plurality of servers is utility driven, RES driven, or shutdown.

4. The system of claim 1, wherein switching of the at least a portion of the plurality of servers is initiated in response to a change in the amount of power available from the RES or the load power consumption of the at least one cluster exceeding a corresponding predefined threshold.

5. The system of claim 1, wherein the power manager is configured to switch the at least a portion of the plurality of servers to smooth power fluctuation of RES powered servers.

6. The system of claim 1, wherein the RES is a photovoltaic source or a wind-driven renewable energy source.

7. The system of claim 1, wherein the switching history comprises a switching frequency of the server loads.

8. The system of claim 1, wherein the switching history comprises switching outcomes of server loads.

9. The system of claim 1, wherein the switch scheduler is configured to monitor a power provisioning status of loads on the plurality of servers.

10. A system, comprising:
    at least one cluster including a plurality of servers; and
    a power manager configured to switch at least a portion of the plurality of servers between a renewable energy supply (RES) and a utility energy supply based at least in part upon a budget level corresponding to an amount of power available from the RES and a load power consumption of the at least one cluster, where the power manager comprises a central switch controller configured to switch the at least a portion of the plurality of servers based upon a switch assignment determined by a switch scheduler that is configured to allocate switch operations of the switch assignment using a least recently used (LRU) scheme based at least in part upon a switching frequency of server loads.

11. The system of claim 10, wherein allocation of the switch operations is based at least in part upon the switching frequency of the server loads during a preceding control period.

12. The system of claim 10, wherein the switch operations are allocated based at least in part upon a quantity of servers in the at least one cluster.

13. A method, comprising:
    determining a budget level corresponding to an amount of power available from a renewable energy supply (RES); and
    switching server loads of at least one cluster of servers between the RES and a utility energy supply based at least in part the budget level and a load power consumption of the at least one cluster, where switch operations are allocated using a least recently used (LRU) scheme based at least in part upon a switching frequency of the server loads.

14. The method of claim 13, wherein switching server loads of at least one cluster of servers comprises switching at least a portion of the plurality of servers between the RES and the utility energy supply.

15. The method of claim 14, wherein a central switch controller is configured to switch the at least a portion of the plurality of servers.

16. The method of claim 14, wherein the at least a portion of the plurality of servers are switched based upon a switch assignment that indicates whether each of the plurality of servers is utility driven, RES driven, or shutdown.

17. The method of claim 14, wherein switching of the at least a portion of the plurality of servers is initiated in response to a change in the amount of power available from the RES or the load power consumption of the at least one cluster exceeding a corresponding predefined threshold.

18. The method of claim 14, wherein the at least a portion of the plurality of servers is switched to smooth power fluctuation of RES powered servers.

19. The method of claim 13, wherein switching server loads of at least one cluster of servers comprises virtual machine migration to move workload between servers.

20. The system of claim 13, wherein the RES is a photovoltaic source or a wind-driven renewable energy source.

21. The method of claim 13, wherein allocation of the switch operations is based at least in part upon the switching frequency of the server loads during a preceding control period.

22. The method of claim 13, wherein the switch operations are allocated based at least in part upon a quantity of servers in the at least one cluster.

* * * * *